United States Patent
Imai et al.

(10) Patent No.: US 8,063,146 B2
(45) Date of Patent: Nov. 22, 2011

(54) THERMOPLASTIC ELASTOMER COMPOSITION

(75) Inventors: Tadashi Imai, Koto-ku (JP); Takuo Asami, Chiba (JP); Masakazu Jitsukata, Isumi (JP); Keiji Okada, Chiba (JP)

(73) Assignee: Mitsui Chemicals, Inc., Tokyo (JP)

(*) Notice: Subject to any disclaimer, the term of this patent is extended or adjusted under 35 U.S.C. 154(b) by 61 days.

(21) Appl. No.: 12/452,024

(22) PCT Filed: Jun. 2, 2008

(86) PCT No.: PCT/JP2008/060127
§ 371 (c)(1),
(2), (4) Date: Dec. 11, 2009

(87) PCT Pub. No.: WO2008/152933
PCT Pub. Date: Dec. 18, 2008

(65) Prior Publication Data
US 2010/0120933 A1    May 13, 2010

(30) Foreign Application Priority Data

Jun. 14, 2007 (JP) .................. 2007-156975

(51) Int. Cl.
*C08L 23/16* (2006.01)
*C08L 23/20* (2006.01)
*C08F 4/6592* (2006.01)
*C08F 210/06* (2006.01)
*C08F 210/08* (2006.01)

(52) U.S. Cl. .............. 525/191; 525/232; 525/240
(58) Field of Classification Search ............ 525/191, 525/232, 240
See application file for complete search history.

(56) References Cited

U.S. PATENT DOCUMENTS

| | | | |
|---|---|---|---|
| 5,128,413 A | 7/1992 | Yonekura et al. | |
| 5,998,039 A | 12/1999 | Tanizaki et al. | |
| 6,500,561 B1 | 12/2002 | Yoshida et al. | |
| 6,696,516 B2 | 2/2004 | Morikawa et al. | |
| 6,710,129 B2* | 3/2004 | Matayoshi et al. | 525/191 |
| 2006/0167182 A1 | 7/2006 | Onishi et al. | |
| 2006/0276607 A1 | 12/2006 | Ikenaga et al. | |
| 2007/0173591 A1 | 7/2007 | Kanae et al. | |

FOREIGN PATENT DOCUMENTS

| | | |
|---|---|---|
| EP | 1 683 836 A1 | 7/2006 |
| EP | 1 712 591 A1 | 10/2006 |
| EP | 1 741 747 A1 | 1/2007 |
| JP | 60-173032 | 9/1985 |
| JP | 2-115249 | 4/1990 |
| JP | 6-47816 | 2/1994 |
| JP | 8-208909 | 8/1996 |
| JP | 8-244068 | 9/1996 |
| JP | 9-118133 | 5/1997 |
| JP | 10-7849 | 1/1998 |
| JP | 10-324200 | 12/1998 |
| JP | 2001-171439 | 6/2001 |
| JP | 3693017 | 7/2005 |
| WO | WO 2004/087775 A1 | 10/2004 |

OTHER PUBLICATIONS

Extended European Search Report; EP No. 08777078.0-2109; issued May 17, 2011.

* cited by examiner

*Primary Examiner* — Nathan M Nutter
(74) *Attorney, Agent, or Firm* — Foley & Lardner LLP

(57) ABSTRACT

Disclosed is a thermoplastic elastomer composition containing 10-60 parts by weight of a non-crosslinkable crystalline polyolefin resin (A), 1-30 parts by weight of a specific propylene 1-butene random copolymer (B) and 89-10 parts by weight of an ethylene α-olefin non-conjugated polyene copolymer rubber (C) which is composed of ethylene, an α-olefin having 3-20 carbon atoms and a non-conjugated polyene, in such amounts that the total of the components (A), (B) and (C) is 100 parts by weight. The thermoplastic elastomer composition is dynamically crosslinked by an extruder. This thermoplastic elastomer is excellent in moldability and economic efficiency, and enables to obtain a molded body exhibiting sufficient adhesion strength to a vulcanized rubber or thermoplastic elastomer without the intermediation of an adhesive layer, as well as a lightweight molded body having sufficient hardness and rubber elasticity.

11 Claims, 1 Drawing Sheet

THERMOPLASTIC ELASTOMER COMPOSITION

TECHNICAL FIELD

The present invention relates to a thermoplastic elastomer composition.

BACKGROUND ART

Conventionally, a weather strip having connections has been typically manufactured by cutting a rubber blend product of an ethylene/propylene/non-conjugated diene terpolymer (EDPM) that is formed by extrusion and vulcanization, placing the same in a mold from one or both sides of the mold, injecting a rubber molding material of a similar kind to the EPDM rubber blend into a cavity formed in the mold, and then performing vulcanization and molding.

Further, in place of the vulcanized rubber using a ethylene/propylene/non-conjugated diene terpolymer (EPDM), a thermoplastic elastomer (composition) that does not need to be vulcanized has come into use as the material for molding, from the viewpoint of productivity, environmental affinity and weight reduction.

In general, since a vulcanized rubber and a thermoplastic elastomer cannot be bonded to each other by vulcanization or the like, these components are integrated using an adhesive. However, this method is not considered to be sufficient from the viewpoint of productivity and environmental affinity. Further, sufficient adhesion is not achieved even when thermoplastic elastomer components are adhered to each other.

Addition of a resin containing a polar group is one technique directed to the composition of thermoplastic elastomer (Japanese Patent Application Laid-Open (JP-A) Nos. 2-115249, 8-244068, and 10-324200). However, when a resin containing a polar group is added, releasing properties of the molded product from a mold may deteriorate during molding, and thus extension of the molding cycle may occur. Further, a thermoplastic elastomer using an α-olefin non-crystalline polymer having a viscosity of not more than a specific degree has been proposed (Japanese Patent No. 3693017). In this case, however, a sufficient level of adhesion is not achieved and elasticity of the rubber may deteriorate.

Further, addition of a microcrystalline polypropylene to a conventional vulcanized rubber composition is one technique for producing the aforementioned vulcanized rubber (JP-A No. 10-7849). However, when a microcrystalline polypropylene such as atactic polypropylene is added, the elasticity of a conventional rubber may deteriorate, and the stickiness or hardness of the molded product may increase with time.

In addition to the techniques concerning the composition of thermoplastic elastomer and vulcanized rubber as mentioned above, there is a technique of achieving an anchoring effect by forming irregularities on a cut surface of the vulcanized rubber (JP-A No. 9-118133) and a technique of applying a polyolefin resin powder on a cut surface of the vulcanized rubber (JP-A No. 6-47816). However, these techniques are unsatisfactory insofar as improvements in adhesion are insufficient in view of the reduction in productivity caused by these techniques.

Accordingly, there is demand for a thermoplastic elastomer that forms a molded product that exhibits a sufficient level of adhesion with respect to a vulcanized rubber or a thermoplastic elastomer without the use of an adhesive layer, and a molded product formed by welding this elastomer to a vulcanized rubber or a thermoplastic elastomer. Further, there is demand for a thermoplastic elastomer that forms a light-weight molded product that exhibits sufficient hardness and rubber elasticity as a thermoplastic elastomer and exhibits excellent molding properties and economic efficiency, and a molded product formed by welding this elastomer to a vulcanized rubber or a thermoplastic elastomer.

DISCLOSURE OF THE INVENTION

Problems to be Solved by the Invention

The present invention aims to solve the aforementioned problems in the conventional techniques, and aims to provide a thermoplastic elastomer that forms a molded product that exhibits a sufficient level of adhesion strength with respect to a vulcanized rubber or a thermoplastic elastomer without the use of an adhesive layer, the thermoplastic elastomer forming a light-weight molded product that exhibits sufficient hardness and rubber elasticity and exhibiting excellent molding properties and economic efficiency. The present invention further aims to provide a thermoplastic elastomer that is suitably used for welding or forming an odd-shaped corner connection or end portion of a weather strip or door trim of an automobile, and applications for the same.

Means for Solving the Problem

The above problems are solved by the following means.

<1> A thermoplastic elastomer composition obtained by dynamic crosslinking with an extruder, the thermoplastic elastomer composition comprising:

(A) 10 to 60 parts by weight of a non-crosslinkable crystalline polyolefin resin;

(B) 1 to 30 parts by weight of a propylene/1-butene random copolymer; and (C) 89 to 10 parts by weight of an ethylene/α-olefin/non-conjugated polyene copolymer composed of ethylene, an α-olefin having 3 to 20 carbon atoms and a non-conjugated polyene, the total of the components (A) (B) and (C) being 100 parts by weight, and the propylene/1-butene random copolymer (B) satisfying the following conditions (1), (2), (3) and (4):

(1) including a propylene-derived unit in an amount of from 60 to 90 mol % and a 1-butene-derived unit in an amount of from 10 to 40 mol %;

(2) having a triad isotacticity as determined from $^{13}$C-NMR spectrum measurement of from 85% to 99%;

(3) having a molecular weight distribution (Mw/Mn) as determined from gel permeation chromatography (GPC) of from 1 to 3; and (4) having an intrinsic viscosity (η) as measured at 135° C. in decalin of from 0.7 to 12 dl/g.

<2> The thermoplastic elastomer composition according to <1>, wherein the propylene/1-butene random copolymer (B) further satisfies the following conditions (5) and (6):

(5) having a melting point (Tm) as measured with a differential scanning calorimeter of from 40 to 120° C.; and (6) satisfying a relationship between the melting point (Tm) and the content of the 1-butene unit M (mol %) of $160 \exp(-0.020M) \geq Tm \geq 125 \exp(-0.032M)$.

<3> The thermoplastic elastomer composition according to <1> or <2>, further comprising a softening agent in an amount of from 1 to 200 parts by weight with respect to 100 parts by weight of the total of (A), (B) and (C).

<4> The thermoplastic elastomer composition according to any one of <1> to <3>, wherein the triad isotacticity as determined from $^{13}$C-NMR spectrum measurement of the propylene/1-butene random copolymer (B) is from 85% to 97.5%.

<5> The thermoplastic elastomer composition according to any one of <2> to <4>, wherein the relationship between the melting point Tm and the content of the 1-butene unit M (mol %) of the propylene/1-butene random copolymer (B) is 160 exp(−0.022M)≧Tm≧125 exp(−0.032M).

<6> The thermoplastic elastomer composition according to any one of <2> to <5>, wherein the relationship between the melting point Tm and the content of the 1-butene unit M (mol %) of the propylene/1-butene random copolymer (B) is 146 exp(−0.022M)≧Tm≧125 exp(−0.032M).

<7> The thermoplastic elastomer composition according to any one of <1> to <6>, wherein the intrinsic viscosity of the propylene/1-butene random copolymer (B) as measured at 135° C. in decalin is from 1.0 to 12 dl/g.

<8> The thermoplastic elastomer composition according to any one of <1> to <7>, wherein the propylene/1-butene random copolymer (B) is obtained by copolymerizing propylene and 1-butene in the presence of an olefin polymerization catalyst, the olefin polymerization catalyst comprising a transition metal compound represented by the following formula (1a), an organoaluminum oxy compound (1b) and/or a compound (2b) that reacts with the transition metal compound (1a) to form an ion pair:

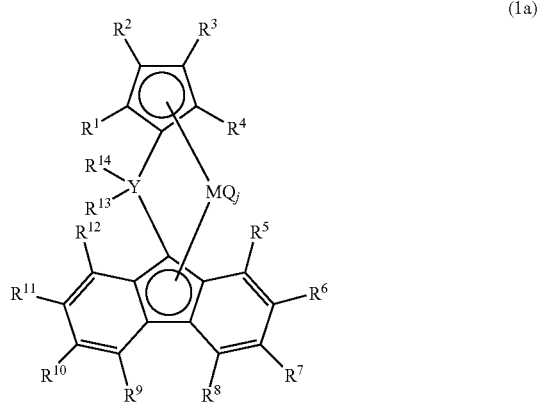

wherein in formula (1a), $R^3$ is a hydrocarbon group or a silicon-containing group; $R^1$, $R^2$ and $R^4$ each independently represent a hydrogen atom, a hydrocarbon group or a silicon-containing group; $R^5$, $R^6$, $R^7$, $R^8$, $R^9$, $R^{10}$, $R^{11}$, $R^{12}$, $R^{13}$ and $R^{14}$ each independently represent a hydrogen atom, a hydrocarbon group or a silicon-containing group, where any adjacent two of $R^5$ to $R^{12}$ may bond to each other to form a ring, and $R^{13}$ and $R^{14}$ may bond to each other to form a ring; M is a transition metal in Group IV; Y is a carbon atom; each Q independently represents a halogen atom, a hydrocarbon group, an anion ligand or a neutral ligand capable of coordination with a lone electron pair; and j is an integer of from 1 to 4.

<9> The thermoplastic elastomer composition according to <8>, wherein the olefin polymerization catalyst further comprises an organoaluminum compound (c).

<10> The thermoplastic elastomer composition according to any one of <1> to <9>, which is used for welding to a molded product of vulcanized rubber or to a molded product of thermoplastic elastomer.

<11> The thermoplastic elastomer composition according to <10>, further comprising a blowing agent.

EFFECTS OF THE INVENTION

Since a propylene/1-butene random copolymer (B) is added to the thermoplastic elastomer composition according to the present invention, the composition exhibits favorable welding properties with respect to a vulcanized rubber molded product and a thermoplastic elastomer molded product. Therefore, a high level of adhesion in a peeling test after the welding and an excellent elongation property before peeling may be achieved.

Accordingly, the thermoplastic elastomer composition according to the invention is suitably used for welding to a molded product of vulcanized rubber or thermoplastic elastomer.

The molded product formed from the thermoplastic elastomer composition according to the invention is favorably used for interior or exterior members of automobiles, such as a weather strip. Specifically, for example, when a weather strip is formed by jointing a straight member and a corner member, it may be composed of the aforesaid molded product of vulcanized rubber or thermoplastic elastomer as the straight member, and a molded product formed from the thermoplastic elastomer composition according to the invention as the corner member.

The molded product formed by welding the thermoplastic elastomer composition according to the invention to a molded product of vulcanized rubber or thermoplastic elastomer can be obtained by insert molding.

The thermoplastic elastomer composition according to the invention can form a light-weight molded product that exhibits sufficient adhesion strength and excellent elongation during peeling, without using an adhesive layer. Further, the thermoplastic elastomer composition according to the invention can form a molded product having satisfactory hardness and rubber elasticity as a thermoplastic elastomer.

The invention can provide a thermoplastic elastomer composition that forms a molded product that exhibits sufficient adhesion strength with respect to vulcanized rubber or thermoplastic elastomer, without the use of an adhesive layer; a molded product formed by welding this composition to vulcanized rubber; a thermoplastic elastomer composition that exhibits excellent molding properties and economic efficiency, and forms a light-weight molded product that exhibits satisfactory hardness and rubber elasticity as a thermoplastic elastomer; and a molded product formed by welding this composition to a molded product of vulcanized rubber or a molded product of thermoplastic elastomer.

BEST MODE FOR CARRYING OUT THE INVENTION

Figure 1:
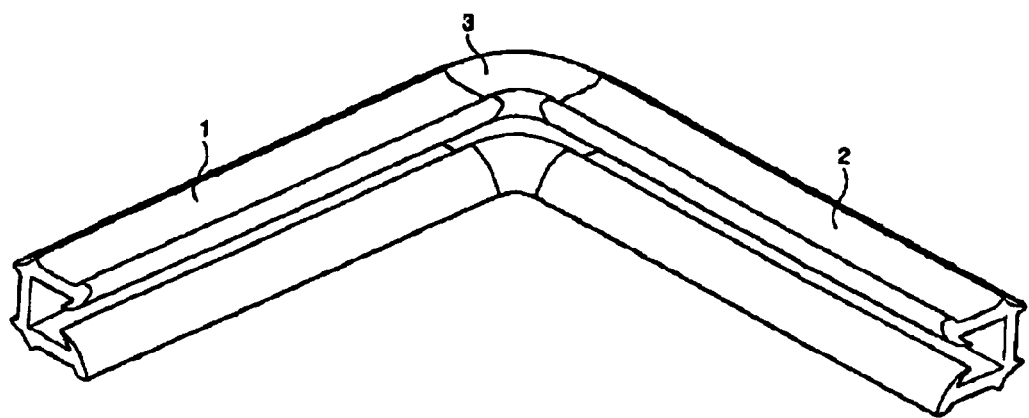
FIG. 1 is a schematic perspective view showing one example of a weather strip for an automobile, the weather strip including a corner portion formed from the thermoplastic elastomer composition according to the invention.

In the following, the thermoplastic elastomer composition according to the invention and the use thereof will be specifically described.

Non-Crosslinkable Crystalline Polyolefin Resin (A)

The non-crosslinkable crystalline polyolefin resin (A) that is used as a component of the thermoplastic elastomer composition is a crystalline, high-molecular product obtained by polymerizing one or more kinds of mono-olefin, by either a high-pressure method or a low-pressure method. Examples of the polyolefin resin (A) include isotactic and syndiotactic mono-olefin polymer resins. Representative resins thereof are commercially available.

Examples of appropriate starting olefins for the above-mentioned non-crosslinkable crystalline polyolefine resin (A) include α-olefins having 2 to 20 carbon atoms, preferably 2 to 12 carbon atoms, such as ethylene, propylene, 1-butene, 1-pentene, 1-hexene, 1-octene, 1-decene, 2-methyl-1-propene, 3-methyl-1-pentene, 4-methyl-1-pentene, and 5-methyl-1-hexene. These α-olefins may be used alone or as a mixture of two or more kinds.

Any type of polymerization mode may be applicable, such as a random-type or a block-type, as long as a resinous product can be obtained.

The non-crosslinkable crystalline polyolefin resin (A) is preferably a propylene-based polymer, and specific examples thereof include a propylene homopolymer, a propylene/ethylene block copolymer, a propylene/ethylene random copolymer, and a propylene/ethylene/butene random copolymer. Among these, a propylene/ethylene random copolymer and a propylene/ethylene/butene random copolymer are particularly preferred.

The non-crosslinkable crystalline polyolefin resin (A) preferably has a melt flow rate (MFR: ASTMD1238-65T, 230° C., 2.16 kg load) of typically from 0.01 to 100 g/10 min, preferably from 0.05 to 50 g/10 min.

The crystalline polyolefin resin (A) plays a part of improving fluidity and heat resistance of the thermoplastic elastomer composition of the invention. The crystalline polyolefin resins (A) may be used alone or in combination of two or more kinds. The type of the crystalline polyolefin resin (A) is not particularly limited but includes a polypropylene, and a polypropylene is particularly preferred.

The non-crosslinkable crystalline polyolefin resin (A) according to the invention is used in an amount of 10 to 60 parts by weight, preferably 12.5 to 50 parts by weight, still more preferably 15 to 40 parts by weight, with respect to 100 parts by weight of the total amount of the non-crosslinkable crystalline polyolefin resin (A), propylene/1-butene random copolymer (B), and ethylene/α-olefin/non-conjugated polyene copolymer rubber (C) that is composed of ethylene, an α-olefin having from 3 to 20 carbon atoms, and a non-conjugated polyene.

Propylene/1-butene Random Copolymer (B)

(1) Monomer Composition

The propylene/1-butene random copolymer (B) that is used as a component of the thermoplastic elastomer composition includes a propylene-derived unit in an amount of from 60 to 90 mol %, preferably from 65 to 88 mol %, more preferably from 70 to 85 mol %, still more preferably from 70 to 75 mol %, and a 1-butene-derived unit in an amount of from 10 to 40 mol %, preferably from 12 to 35 mol %, more preferably from 15 to 30 mol %, still more preferably from 25 to 30 mol %. When the propylene/1-butene random copolymer (B) of the invention has a melting point of 75° C. or lower, the propylene/1-butene random copolymer (B) preferably has a crystallization rate (½ crystallization time) as measured at 45° C. of 10 minutes or less, more preferably 7 minutes or less.

This propylene/1-butene random copolymer (B) may include a unit derived from an olefin other than propylene or 1-butene, such as ethylene, at a small amount, for example, in an amount of 10 mol % or less.

(2) Stereoregularity (Triad Isotacticity; mm Fraction) of Propylene/1-Butene Random Copolymer (B)

The stereoregularity of the propylene/1-butene random copolymer (B) can be evaluated by its triad isotacticity (mm fraction).

When a sequence of three, head-to-tail enchained propylene units existing in a polymer chain is expressed by a surface zigzag structure, the mm fraction is defined as a proportion of the propylene unit sequences in which the branch direction of methyl groups is the same, and this proportion can be determined from a $^{13}$C-NMR spectrum as described below.

In determining the mm fraction of the propylene/1-butene random copolymer (B) from the $^{13}$C-NMR spectrum, the mm fraction is measured at, as a triad sequence including a propylene unit existing in the polymer chain, (i) a head-to-tail enchained propylene unit triad sequence, and (ii) a propylene unit-butene unit triad sequence including a head-to-tail enchained propylene unit and a butene unit, where the second unit is a propylene unit.

The mm fraction is determined from the peak intensity at the side-chain methyl group of the second unit (propylene unit) in the triad sequences (i) and (ii). Details thereof are described below.

The $^{13}$C-NMR spectrum of the propylene/1-butene random copolymer (B) is measured by a proton complete decoupling method at 120° C., after completely dissolving the propylene/1-butene random copolymer (PBR) in hexachlorobutadiene including a small amount of deuterated benzene as a lock solvent in a sample tube. The measurement is conducted with a flip angle of 45° and a pulse interval of 3.4 T1 or more (T1 is the longest time among the spin-lattice relaxation time of methyl groups). Since the T1 of a methylene group and the T1 of a methine group are shorter than that of a methyl group, the recovery ratio of magnetization of all carbon atoms in the sample is 99% or more under these conditions. The chemical shift is determined as 21.593 ppm of a carbon peak of the methyl group in the third unit of a head-to-tail enchained propylene unit pentad sequence (mmmm) based on tetramethylsilane as a standard, and other carbon peaks are determined based on this peak.

In the $^{13}$C-NMR spectrum of the propylene/1-butene random copolymer (B) thus measured, the methyl carbon region at which a side-chain methyl group of the propylene unit is observed (about 19.5 to 21.9 ppm) is classified into a first peak region (about 21.0 to 21.9 ppm), a second peak region (about 20.2 to 21.0 ppm), and a third peak region (about 19.5 to 20.2 ppm).

In each of the above regions, a peak of the side-chain methyl group of the second unit (propylene unit) is observed in the head-to-tail enchained triad sequences (i) and (ii), as shown in Table 1.

TABLE 1

| | | Methyl carbon region (19.5 to 21.9 ppm) | | |
|---|---|---|---|---|
| | Shift value | First region 21.0 to 21.9 ppm | Second region 20.2 to 21.0 ppm | Third region 19.5 to 20.2 ppm |
| Head-to-tail enchainment | Sequence (i) Sequence (ii) | PPP (mm) PPB (mm) BPB (mm) | PPP (mr) PPB (mr) BPB (mr) PPB (rr) BPB (rr) | PPP (rr) |

In the above table, P indicates a unit derived from propylene and B indicates a unit derived from 1-butene. Among the head-to-tail enchained triad sequences (i) and (ii) as shown in Table 1, the direction of methyl groups in the triad sequence (i) where all of the three units are a propylene unit, i.e., PPP (mm), PPP (mr) and PPP (rr), is shown below in a surface zigzag structure. The mm, mr and rr enchainments in the triad sequence (ii) including a butene unit (PPB, BPB) are also based on this PPP.

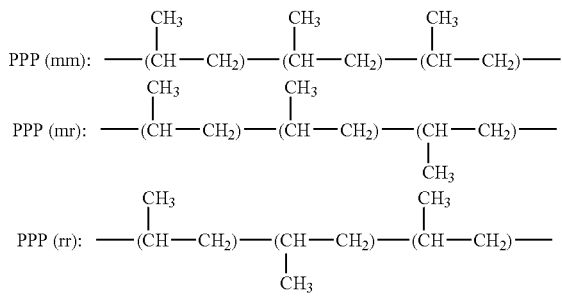

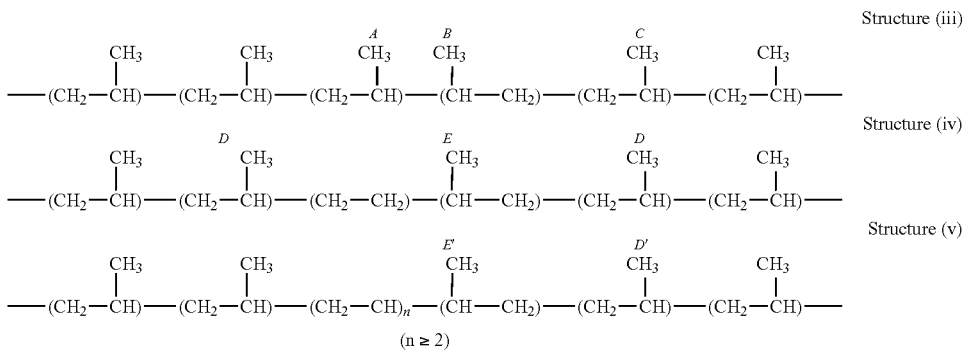

The propylene/1-butene random copolymer (B) has a mm fraction as determined above of from 85% to 99%, preferably from 85% to 97.5%, still more preferably from 87.5% to 97.5%. In the invention, it is important that the value of mm fraction is not too large. When the mm fraction is in a specified range, the melting point can be lowered even if propylene is included in a relatively large amount. The propylene/1-butene random copolymer (PBR) also includes, other than the aforementioned head-to-tail enchained triad sequences (i) and (ii), a partial structure such as those represented by the following structures (iii), (iv) and (v), and a peak derived from a side-chain methyl group in a propylene unit of these structures are also observed in the methyl carbon region (19.5 to 21.9 ppm).

In the first region, the methyl group of the second unit (propylene unit) in the mm-enchained triad sequences PPP, PPB and BPB resonates. In the second region, the methyl group of the second unit (propylene unit) in the mr-chained triad sequences PPP, PPB and BPB and the methyl group of the second unit (propylene unit) in the rr-enchained triad sequences PPB and BPB resonate.

In the third region, the methyl group of the second unit (propylene units) in the rr-enchained triad sequence PPP resonates. Accordingly, the triad isotacticity (mm fraction) of the propylene/1-butene random copolymer (B) can be determined as a proportion (percentage) of the area of a peak that appears in a region of 21.0 to 21.9 ppm (first region) with respect to the total area of a peak that appears in a region of 19.5 to 21.9 ppm (methyl carbon region) defined as 100%, in accordance with the following equation by conducting $^{13}$C-NMR spectrum measurement (using a hexachlorobutadiene solution and tetramethylsilane standard) at a side-chain methyl group of a propylene unit of (i) the head-to-tail enchained propylene unit triad sequences or (ii) the propylene unit-butene unit triad sequences consisting of head-to-tail enchained propylene units and a butene unit where the second unit is a propylene unit.

Among the methyl groups in the above structures (iii), (iv) and (v), methyl carbon A and the methyl carbon B resonate at 17.3 ppm and 17.0 ppm, respectively. Therefore, peaks based on carbon A and carbon B do not appear in the first to third regions (19.5 to 21.9 ppm). Further, since carbon A and carbon B are not involved in the formation of head-to-tail enchained propylene triad sequence, these carbons need not to be considered in the calculation of triad isotacticity (mm fraction).

The peak based on the methyl carbon C, the peak based on the methyl carbon D and the peak based on the methyl carbon D' appear in the second region, and the peak based on the methyl carbon E and the peak based on the methyl carbon E' appear in the third region.

Accordingly, in the first to third methyl carbon regions, peaks based on the PPE-methyl group (side-chain methyl group in the propylene-propylene-ethylene sequence) (around 20.7 ppm), the EPE-methyl group (side-chain methyl group in the ethylene-propylene-ethylene sequence) (around 19.8 ppm), and the methyl groups C, D, D', E and E' appear.

As described above, peaks based on the methyl groups other than those based on the head-to-tail triad sequences (i) and (ii) are also observed in the methyl carbon region. In calculating the mm fraction from the above formula, existence of these peaks is corrected in the following manner.

The peak area based on the PPE-methyl group can be calculated from the peak area of a PPE-methine group (resonates at around 30.6 ppm), and the peak area based on the EPE-methyl group can be calculated from the peak area of a EPE-methine group (resonates at around 32.9 ppm).

The peak area based on the methyl group C can be calculated from the peak area of an adjacent methine group (resonates at 31.3 ppm). The peak area based on the methyl group D can be calculated from ½ of the total peak area of the peaks based on the αβ methylene carbon in the above structure (iv) (resonates at around 34.3 ppm and around 34.5 ppm), and the peak area based on the methyl group D' can be calculated from the area of the peak based on a methine group adjacent to the methyl group of the methyl group E' in the above structure (v) (resonates at around 33.3 ppm).

The peak area based on the methyl group E can be calculated from the peak area of an adjacent methine carbon (resonates at around 33.7 ppm), and the peak area of the methyl group E' can be calculated from the peak area of an adjacent methine carbon (resonates at around 33.3 ppm).

Accordingly, the peak area of the methyl groups based on the head-to-tail enchained propylene unit triad sequences (i) and (ii) can be obtained by subtracting the area of peaks of the above methyl groups from the total area of the peaks in the second and third regions.

In this way, the peak area of the methyl groups based on the head-to-tail enchained propylene unit triad sequences (i) and (ii) can be evaluated, and thus the mm fraction can be calculated in accordance with the equation as described above.

The carbon peaks in each spectrum can be assigned with reference to *Polymer*, 30, 1350 (1989).

(3) Molecular Weight Distribution (Mw/Mn)

The molecular weight distribution (Mw/Mn) of the propylene/1-butene random copolymer (B) as measured by gel permeation chromatography (GPC) is from 1 to 3, preferably from 1.8 to 3.0, more preferably 1.9 to 2.5.

(4) Intrinsic Viscosity (η)

The intrinsic viscosity (η) of the propylene/1-butene random copolymer (B) as measured in decalin at 135° C. is from 0.7 to 12 dl/g, preferably from 1.0 to 12 dl/g, more preferably 1.5 to 12 dl/g.

(5) The melting point Tm as measured by using a differential scanning calorimeter is preferably from 40 to 120° C., more preferably from 50 to 100° C., still more preferably from 55 to 90° C.

The above melting point Tm and the content of 1-butene unit M (mol %) preferably satisfies a relationship of 160 exp(−0.022M)≧Tm≧125 exp(−0.032M); more preferably 146 exp(−0.022M)≧Tm≧125 exp(−0.032M); still more preferably 146 exp(−0.024M)≧Tm≧125 exp(−0.032M).

When the melting point and the butene content satisfy the above relationship, the melting point can be lowered while including propylene at a relatively high content, thereby achieving a high degree of crystallization rate while having a low melting point.

(7) Randomness Parameter B Value

The parameter B value that indicates the ramdomness of copolymerized monomer sequence distribution of the propylene/1-butene random copolymer (B) is preferably from 0.9 to 1.3, more preferably from 0.95 to 1.25, still more preferably from 0.95 to 1.2.

The parameter B value was proposed by Cole-man et al. (B. D. Cole-man and T. G. Fox, *J. Polym. Sci.*, A1, 3183 (1963)), and this parameter is defined as follows.

$$B = P_{12}/(2P_1 \cdot P_2)$$

wherein $P_1$ and $P_2$ are each a content fraction of a first monomer and a content fraction of a second monomer, and $P_{12}$ is a proportion of a first monomer-second monomer sequence in all sequences in these two molecules.

When B=1, the copolymer obeys Bernoulli's statistics; when B<1, the copolymer has a block-like structure; and when B>1, the copolymer has a structure close to alternating; and when B=2, the copolymer has an alternating structure.

The propylene/1-butene random copolymer (B) according to the invention may include a small amount of a structure including a hetero bond unit (regio-irregular unit) based on the 2,1-insertion or 1,3-insertion of propylene in the propylene sequence.

During the polymerization, the aforesaid head-to-tail enchained propylene sequence is typically formed as a result of 1,2-insertion of propylene (the methylene side is bonded a catalyst). However, in rare cases, 2,1-insertion or 1,3-insertion of propylene occurs and the propylene forms a regio-irregular unit such as those represented by the aforementioned structures (iii), (iv) and (v) in the polymer. The proportion of 2,1-insertion and 1,3-insertion of propylene in the polymer unit can be calculated from the following equation with reference to "*Polymer*", 30, 1350 (1989), using a $^{13}$C-NMR spectrum in a similar manner to the aforesaid stereoregularity.

The proportion of the regio-irregular unit based on 2,1-insertion of propylene can be calculated from the following equation.

$$\text{Proportion of regio-irregular unit based on 2,1-insertion of propylene} = \frac{\{0.51 I\alpha\beta \,(\text{structure}\,(iii),\,(v)) + 0.25 I\alpha\beta \,(\text{structure}\,(iv))\}}{I\alpha\alpha + I\alpha\beta \,(\text{structure}\,(iii),\,(v)) + 0.5\,(I\alpha\gamma + I\alpha\beta\,(\text{structure}\,(iv)) + I\alpha\delta)} \times 100$$

When it is difficult to determine the area of Iαβ or the like directly from the spectrum due to the overlapping of the peaks or the like, it can be corrected using a carbon peak having the corresponding area.

The propylene/1-butene random copolymer (B) according to the invention may contain a hetero bond unit based on 2,1-insertion of propylene in the propylene sequence as determined above in an amount of 0.01% or more, specifically from about 0.01 to 1.0%, with respect to the total propylene constituent units.

The proportion of regio-irregular unit based on 1,3-insertion of propylene in the propylene/1-butene random copolymer (PBR) can be determined from a βγ peak (resonates at around 27.4 ppm).

In the propylene/1-butene random copolymer (B) according to the invention, the proportion of hetero bonds based on 1,3-insertion of propylene may be 0.05% or less.

The propylene/1-butene random copolymer (B) as described above that may be used in the invention can be obtained by the following methods by copolymerizing propylene and 1-butene in the presence of a catalyst for olefin polymerization. The catalyst includes a transition metal compound (1a) represented by the following formula (1a); an organoaluminum oxy compound (1b); and/or a compound (2b) that reacts with the transition metal compound (1a) to form an ion pair; and optionally an organoaluminum compound (C).

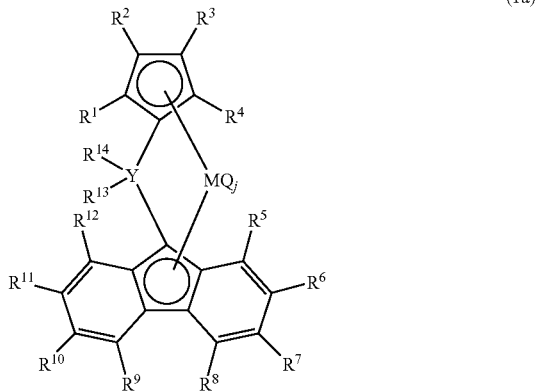

wherein $R^3$ is a hydrocarbon group or a silicon-containing group; $R^1$, $R^2$ and $R^4$ each independently represent a hydrogen atom, a hydrocarbon group or a silicon-containing group; $R^5$, $R^6$, $R^7$, $R^8$, $R^9$, $R^{10}$, $R^{11}$, $R^{12}$, $R^{13}$ and $R^{14}$ each independently represent a hydrogen atom, a hydrocarbon group or a silicon-containing group, where any adjacent two of $R^5$ to $R^{12}$ may bond to each other to form a ring, and $R^{13}$ and $R^{14}$ may bond to each other to form a ring; M is a transition metal in Group IV; Y is a carbon atom; each Q independently represents a halogen atom, a hydrocarbon group, an anion ligand or a neutral ligand capable of coordination with a lone electron pair; and j is an integer of from 1 to 4. Preferably, $R^1$ is a hydrocarbon group or a silicon-containing group.

Specific examples of the transition metal compound represented by formula (1a) include bridged C1 symmetric metallocene compounds, such as isopropylidene(3-tert-butylcyclopentadienyl)(fluorenyl)zirconium dichloride, isopropylidene(3-tert-butylcyclopentadienyl)(2,7-di-tert-butylfluorenyl)zirconium dichloride, isopropylidene(3-tert-butylcyclopentadienyl)(3,6-di-tert-butylfluorenyl)zirconium dichloride, isopropylidene(3-tert-butylcyclopentadienyl)(octamethyloctahydridodibenzofluorenyl)zirconium dichloride, diphenylmethylene(3-tert-butylcyclopentadienyl)(fluorenyl)zirconium dichloride, diphenylmethylene(3-tert-butylcyclopentadienyl)(2,7-di-tert-butylfluorenyl)zirconium dichloride, diphenylmethylene(3-tert-butylcyclopentadienyl)(3,6-di-tert-butylfluorenyl)zirconium dichloride, diphenylmethylene(3-tert-butylcyclopentadienyl)(octamethyloctahydridodibenzofluorenyl)zirconium dichloride, cyclohexylidene(3-tert-butylcyclopentadienyl)(fluorenyl)zirconium dichloride, cyclohexylidene(3-tert-butylcyclopentadienyl)(2,7-di-tert-butylfluorenyl)zirconium dichloride, cyclohexylidene(3-tert-butylcyclopentadienyl)(3,6-di-tert-butylfluorenyl)zirconium dichloride, cyclohexylidene(3-tert-butylcyclopentadienyl)(octamethyloctahydridodibenzofluorenyl)zirconium dichloride, phenylmethylmethylene(3-tert-butylcyclopentadienyl)(fluorenyl)zirconium dichloride, phenylmethylmethylene(3-tert-butylcyclopentadienyl)(2,7-di-tert-butylfluorenyl)zirconium dichloride, phenylmethylmethylene(3-tert-butylcyclopentadienyl)(3,6-di-tert-butylfluorenyl)zirconium dichloride, phenylmethylmethylene(3-tert-butylcyclopentadienyl)(octamethyloctahydridodibenzofluorenyl)zirconium dichloride, isopropylidene(3-trimethylsilylcyclopentadienyl)(fluorenyl)zirconium dichloride, isopropylidene(3-trimethylsilylcyclopentadienyl)(2,7-di-tert-butylfluorenyl)zirconium dichloride, isopropylidene(3-trimethylsilylcyclopentadienyl)(3,6-di-tert-butylfluorenyl)zirconium dichloride, isopropylidene(3-trimethylsilylcyclopentadienyl)(octamethyloctahydridodibenzofluorenyl)zirconium dichloride, diphenylmethylene(3-trimethylsilylcyclopentadienyl)(fluorenyl)zirconium dichloride, diphenylmethylene(3-trimethylsilylcyclopentadienyl)(2,7-di-tert-butylfluorenyl)zirconium dichloride, diphenylmethylene(3-trimethylsilylcyclopentadienyl)(3,6-di-tert-butylfluorenyl)zirconium dichloride, diphenylmethylene(3-trimethylsilylcyclopentadienyl)(octamethyloctahydridodibenzofluorenyl)zirconium dichloride, cyclohexylidene(3-trimethylsilylcyclopentadienyl)(fluorenyl)zirconium dichloride, cyclohexylidene(3-trimethylsilylcyclopentadienyl)(2,7-di-tert-butylfluorenyl)zirconium dichloride, cyclohexylidene(3-trimethylsilylcyclopentadienyl)(3,6-di-tert-butylfluorenyl)zirconium dichloride, cyclohexylidene(3-trimethylsilylcyclopentadienyl)(octamethyloctahydridodibenzofluorenyl)zirconium dichloride, phenylmethylmethylene(3-trimethylsilylcyclopentadienyl)(fluorenyl)zirconium dichloride, phenylmethylmethylene(3-trimethylsilylcyclopentadienyl)(2,7-di-tert-butyl fluorenyl)zirconium dichloride, phenylmethylmethylene(3-trimethylsilylcyclopentadienyl)(3,6-di-tert-butylfluorenyl)zirconium dichloride, phenylmethylmethylene(3-trimethylsilylcyclopentadienyl)(octamethyloctahydridodibenzofluorenyl)zirconium dichloride, isopropylidene(3-phenylcyclopentadienyl)(fluorenyl)zirconium dichloride, isopropylidene(3-phenylcyclopentadienyl)(2,7-di-tert-butylfluorenyl)zirconium dichloride, isopropylidene(3-phenylcyclopentadienyl)(3,6-di-tert-butylfluorenyl)zirconium dichloride, isopropylidene(3-phenylcyclopentadienyl)(octamethyloctahydridodibenzofluorenyl)zirconium dichloride, diphenylmethylene(3-phenylcyclopentadienyl)(fluorenyl)zirconium dichloride, diphenylmethylene(3-phenylcyclopentadienyl)(2,7-di-tert-butylfluorenyl)zirconium dichloride, diphenylmethylene(3-phenylcyclopentadienyl)(3,6-di-tert-butylfluorenyl)zirconium dichloride, diphenylmethylene(3-phenylcyclopentadienyl)(octamethyloctahydridodibenzofluorenyl)zirconium dichloride, cyclohexylidene(3-phenylcyclopentadienyl)(fluorenyl)zirconium dichloride, cyclohexylidene(3-phenylcyclopentadienyl)(2,7-di-tert-butylfluorenyl)zirconium dichloride, cyclohexylidene(3-phenylcyclopentadienyl)(3,6-di-tert-butylfluorenyl)zirconium dichloride, cyclohexylidene(3-phenylcyclopentadienyl)(octamethyloctahydridodibenzofluorenyl)zirconium dichloride, phenylmethylmethylene(3-phenylcyclopentadienyl)(fluorenyl)zirconium dichloride, phenylmethylmethylene(3-phenylcyclopentadienyl)(2,7-di-tert-butyl-fluorenyl)zirconium dichloride, phenylmethylmethylene(3-phenylcyclopentadienyl)(3,6-di-tert-butylfluorenyl)zirconium dichloride, phenylmethylmethylene(3-phenylcyclopentadienyl)(octamethyloctahydridodibenzofluorenyl)zirconium dichloride, isopropylidene(3-adamantylcyclopentadienyl)(fluorenyl)zirconium dichloride, isopropylidene(3-adamantylcyclopentadienyl)(2,7-di-tert-butylfluorenyl)zirconium dichloride, isopropylidene(3-adamantylcyclopentadienyl)(3,6-di-tert-butylfluorenyl)zirconium dichloride, isopropylidene(3-adamantylcyclopentadienyl)(octamethyloctahydridodibenzofluorenyl)zirconium dichloride, diphenylmethylene(3-adamantylcyclopentadienyl)(fluorenyl)zirconium dichloride, diphenylmethylene(3-adamantylcyclopentadienyl)(2,7-di-tert-butyl-fluorenyl)zirconium dichloride, diphenylmethylene(3-adamantylcyclopentadienyl)(3,6-di-tert-butylfluorenyl)zirconium dichloride, diphenylmethylene(3-adamantylcyclopentadienyl)(octamethyloctahydridodibenzofluorenyl)zirconium dichloride, cyclohexylidene(3-adamantylcyclopentadienyl)(fluorenyl)zirconium dichloride, cyclohexylidene(3-adamantylcyclopentadienyl)(2,7-di-tert-butylfluorenyl)zirconium dichloride, cyclohexylidene(3-adamantylcyclopentadienyl)(3,6-di-tert-butylfluorenyl)zirconium dichloride, cyclohexylidene(3-adamantylcyclopentadienyl)(octamethyloctahydridodibenzofluorenyl)zirconium dichloride, phenylmethylmethylene(3-adamantylcyclopentadienyl)(fluorenyl)zirconium dichloride, phenylmethylmethylene(3-adamantylcyclopentadienyl)(2,7-di-tert-butylfluorenyl)zirconium dichloride, phenylmethylmethylene(3-adamantylcyclopentadienyl)(3,6-di-tert-butylfluorenyl)zirconium dichloride, phenylmethylmethylene(3-adamantylcyclopentadienyl)(octamethyloctahydridodibenzofluorenyl)zirconium dichloride, isopropylidene(3-adamantyl-3-methylcyclopentadienyl)(fluorenyl)zirconium dichloride, isopropylidene(3-adamantyl-3-methylcyclopentadienyl)(2,7-di-tert-butylfluorenyl)zirconium dichloride, isopropylidene(3-adamantyl-3-methylcyclopentadienyl)(3,6-di-tert-butylfluorenyl)zirconium dichloride, isopropylidene(3-adamantyl-3-methylcyclopentadienyl)(octamethyloctahydridodibenzofluorenyl)zirconium dichloride, diphenylmethylene(3-adamantyl-3-methylcyclopentadienyl)(fluorenyl)zirconium dichloride, diphenylmethylene(3-adamantyl-3-methylcyclopentadienyl)(2,7-di-tert-butylfluorenyl)zirconium dichloride, diphenylmethylene(3-adamantyl-3-methylcyclopentadienyl)(3,6-di-tert-butylfluorenyl)zirconium dichloride, diphenylmethylene(3-adamantyl-3'-methylcyclopentadienyl)(octamethyloctahydridodibenzofluorenyl)zirconium dichloride, cyclohexylidene(3-adamantyl-3-methylcyclopentadienyl)(fluorenyl)zirconium dichloride, cyclohexylidene(3-adamantyl-3-methylcyclopentadienyl)(2,7-di-tert-butylfluorenyl)zirconium dichloride, cyclohexylidene(3-adamantyl-3-methylcyclopentadienyl)(3,6-di-tert-butylfluorenyl)zirconium dichloride, cyclohexylidene(3-adamantyl-3-methylcyclopentadienyl)(octamethyloctahydridodibenzofluorenyl)zirconium dichloride, phenylmethylmethylene(3-adamantyl-3-methylcyclopentadienyl)(fluorenyl)zirconium dichloride, phenylmethylmethylene(3-adamantyl-3-methylcyclopentadienyl)(2,7-di-tert-butylfluorenyl)zirconium dichloride, phenylmethylmethylene(3-adamantyl-3-methylcyclopentadienyl)(3,6-di-tert-butylfluorenyl)zirconium dichloride, phenylmethylmethylene(3-adamantyl-3-methylcyclopentadienyl)(octamethyloctahydridodibenzofluorenyl)zirconium dichloride, isopropylidene(3-furylcyclopentadienyl)(fluorenyl)zirconium dichloride, isopropylidene(3-furylcyclopentadienyl)(2,7-di-tert-butylfluorenyl)zirconium dichloride, isopropylidene(3-furylcyclopentadienyl)(3,6-di-tert-butylfluorenyl)zirconium dichloride, isopropylidene(3-furylcyclopentadienyl)(octamethyloctahydridodibenzofluorenyl)zirconium dichloride, diphenylmethylene(3-furylcyclopentadienyl)(fluorenyl)zirconium dichloride, diphenylmethylene(3-furylcyclopentadienyl)(2,7-di-tert-butylfluorenyl)zirconium dichloride, diphenylmethylene(3-furylcyclopentadienyl)(3,6-di-tert-butylfluorenyl)zirconium dichloride, diphenylmethylene(3-furylcyclopentadienyl)(octamethyloctahydridodibenzofluorenyl)zirconium dichloride, cyclohexylidene(3-furylcyclopentadienyl)(fluorenyl)zirconium dichloride, cyclohexylidene(3-furylcyclopentadienyl)(2,7-di-tert-butylfluorenyl)zirconium dichloride, cyclohexylidene(3-furylcyclopentadienyl)(3,6-di-tert-butylfluorenyl)zirconium dichloride, cyclohexylidene(3-furylcyclopentadienyl)(octamethyloctahydridodibenzofluorenyl)zirconium dichloride, phenylmethylmethylene(3-furylcyclopentadienyl)(fluorenyl)zirconium dichloride, phenylmethylmethylene(3-furylcyclopentadienyl)(2,7-di-tert-butylfluorenyl)zirconium dichloride, phenylmethylmethylene(3-furylcyclopentadienyl)(3,6-di-tert-butylfluorenyl)zirconium dichloride, phenylmethylmethylene(3-furylcyclopentadienyl)(octamethyloctahydridodibenzofluorenyl)zirconium dichloride, isopropylidene(3-thienylcyclopentadienyl)(fluorenyl)zirconium dichloride, isopropylidene(3-thienylcyclopentadienyl)(2,7-di-tert-butylfluorenyl)zirconium dichloride, isopropylidene(3-thienylcyclopentadienyl)(3,6-di-tert-butylfluorenyl)zirconium dichloride, isopropylidene(3-thienylcyclopentadienyl)(octamethyloctahydridodibenzofluorenyl)zirconium dichloride, diphenylmethylene(3-thienylcyclopentadienyl)(fluorenyl)zirconium dichloride, diphenylmethylene(3-thienylcyclopentadienyl)(2,7-di-tert-butylfluorenyl)zirconium dichloride, diphenylmethylene(3-thienylcyclopentadienyl)(3,6-di-tert-butylfluorenyl)zirconium dichloride, diphenylmethylene(3-thienylcyclopentadienyl)(octamethyloctahydridodibenzofluorenyl)zirconium dichloride, cyclohexylidene(3-thienylcyclopentadienyl)(fluorenyl)zirconium dichloride, cyclohexylidene(3-thienylcyclopentadienyl)(2,7-di-tert-butylfluorenyl)zirconium dichloride, cyclohexylidene(3-thienylcyclopentadienyl)(3,6-di-tert-butylfluorenyl)zirconium dichloride, cyclohexylidene(3-thienylcyclopentadienyl)(octamethyloctahydridodibenzofluorenyl)zirconium dichloride, phenylmethylmethylene(3-thienylcyclopentadienyl)(fluorenyl)zirconium dichloride, phenylmethylmethylene(3-thienylcyclopentadienyl)(2,7-di-tert-butylfluorenyl)zirconium dichloride, phenylmethylmethylene(3-thienylcyclopentadienyl)(3,6-di-tert-butylfluorenyl)zirconium dichloride, phenylmethylmethylene(3-thienylcyclopentadienyl)(octamethyloctahydridodibenzofluorenyl) zirconium dichloride, isopropylidene(3-tert-butyl-5-methylcyclopentadienyl)(fluorenyl)zirconium dichloride, isopropylidene(3-tert-butyl-5-methylcyclopentadienyl)(2,7-di-tert-butylfluorenyl)zirconium dichloride, isopropylidene(3-tert-butyl-5-methylcyclopentadienyl)(3,6-di-tert-butyl-fluorenyl)zirconium dichloride, isopropylidene(3-tert-butyl-5-methylcyclopentadienyl)(octamethyloctahydridodibenzofluorenyl)zirconium dichloride, diphenylmethylene(3-tert-butyl-5-methylcyclopentadienyl)(fluorenyl)zirconium dichloride, diphenylmethylene(3-tert-butyl-5-methylcyclopentadienyl)(2,7-di-tert-butylfluorenyl)zirconium dichloride, diphenylmethylene(3-tert-butyl-5-methylcyclopentadienyl)(3,6-di-tert-butylfluorenyl)zirconium dichloride, diphenylmethylene(3-tert-butyl-5-methylcyclopentadienyl)(octamethyloctahydridodibenzofluorenyl)zirconium dichloride, cyclohexylidene(3-tert-butyl-5-methylcyclopentadienyl)(fluorenyl)zirconium dichloride, cyclohexylidene(3-tert-butyl-5-methylcyclopentadienyl)(2,7-di-tert-butylfluorenyl)zirconium dichloride, cyclohexylidene(3-tert-butyl-5-methylcyclopentadienyl)(3,6-di-tert-butylfluorenyl) zirconium dichloride, cyclohexylidene(3-tert-butyl-5-methylcyclopentadienyl)(octamethyloctahydridodibenzofluorenyl)zirconium dichloride, phenylmethylmethylene(3-tert-butyl-5-methylcyclopentadienyl)(fluorenyl)zirconium dichloride, phenylmethylmethylene(3-tert-butyl-5-methylcyclopentadienyl)(2,7-di-tert-butylfluorenyl)zirconium dichloride, phenylmethylmethylene(3-tert-butyl-5-methylcyclopentadienyl)(3,6-di-tert-butylfluorenyl)zirconium dichloride, phenylmethylmethylene(3-tert-butyl-5-methylcyclopentadienyl)(octamethyloctahydridodibenzofluorenyl)zirconium dichloride, isopropylidene(3-trimethylsilyl-5-methylcyclopentadienyl)(fluorenyl)zirconium dichloride, isopropylidene(3-trimethylsilyl-5-methylcyclopentadienyl)(2,7-di-tert-butylfluorenyl)zirconium dichloride, isopropylidene(3-trimethylsilyl-5-methylcyclopentadienyl)(3,6-di-tert-butylfluorenyl)zirconium dichloride, isopropylidene(3-trimethylsilyl-5-methylcyclopentadienyl)(octamethyloctahydridodibenzofluorenyl)zirconium dichloride, diphenylmethylene(3-trimethylsilyl-5-methylcyclopentadienyl)(fluorenyl)zirconium dichloride, diphenylmethylene(3-trimethylsilyl-5-methylcyclopentadienyl)(2,7-di-tert-butylfluorenyl)zirconium dichloride, diphenylmethylene(3-trimethylsilyl-5-methylcyclopentadienyl)(3,6-di-tert-butylfluorenyl)zirconium dichloride, diphenylmethylene(3-trimethylsilyl-5-methylcyclopentadienyl)(octamethyloctahydridodibenzofluorenyl)zirconium dichloride, cyclohexylidene(3-trimethylsilyl-5-methylcyclopentadienyl)(fluorenyl)zirconium dichloride, cyclohexylidene(3-trimethylsilyl-5-methylcyclopentadienyl)(2,7-di-tert-butylfluorenyl)zirconium dichloride, cyclohexylidene(3-trimethylsilyl-5-methylcyclopentadienyl)(3,6-di-tert-butylfluorenyl)zirconium dichloride, cyclohexylidene(3-trimethylsilyl-5-methylcyclopentadienyl)(octamethyloctahydridodibenzofluorenyl)zirconium dichloride, phenylmethylmethylene(3-trimethylsilyl-5-methylcyclopentadienyl)(fluorenyl)zirconium dichloride, phenylmethylmethylene(3-trimethylsilyl-5-methylcyclopentadienyl)(2,7-di-tert-butylfluorenyl)zirconium dichloride, phenylmethylmethylene(3-trimethylsilyl-5-methylcyclopentadienyl)(3,6-di-tert-butylfluorenyl)zirconium dichloride, phenylmethylmethylene(3-trimethylsilyl-5-methylcyclopentadienyl)(octamethyloctahydridodibenzofluorenyl)zirconium dichloride, isopropylidene(3-phenyl-5-methylcyclopentadienyl)(fluorenyl)zirconium dichloride, isopropylidene(3-phenyl-5-methylcyclopentadienyl)(2,7-di-tert-butylfluorenyl)zirconium dichloride, isopropylidene(3-phenyl-5-methylcyclopentadienyl)(3,6-di-tert-butylfluorenyl)zirconium dichloride, isopropylidene(3-phenyl-5-methylcyclopentadienyl)(octamethyloctahydridodibenzofluorenyl)zirconium dichloride, diphenylmethylene(3-phenyl-5-methylcyclopentadienyl)(fluorenyl)zirconium dichloride, diphenylmethylene(3-phenyl-5-methylcyclopentadienyl)(2,7-di-tert-butylfluorenyl)zirconium dichloride, diphenylmethylene(3-phenyl-5-methylcyclopentadienyl)(3,6-di-tert-butylfluorenyl)zirconium dichloride, diphenylmethylene(3-phenyl-5-methylcyclopentadienyl)(octamethyloctahydridodibenzofluorenyl)zirconium dichloride, cyclohexylidene(3-phenyl-5-methylcyclopentadienyl)(fluorenyl)zirconium dichloride, cyclohexylidene(3-phenyl-5-methylcyclopentadienyl)(2,7-di-tert-butylfluorenyl)zirconium dichloride, cyclohexylidene(3-phenyl-5-methylcyclopentadienyl)(3,6-di-tert-butylfluorenyl)zirconium dichloride, cyclohexylidene(3-phenyl-5-methylcyclopentadienyl)(octamethyloctahydridodibenzofluorenyl)zirconium dichloride, phenylmethylmethylene(3-phenyl-5-methylcyclopentadienyl)(fluorenyl)zirconium dichloride, phenylmethylmethylene(3-phenyl-5-methylcyclopentadienyl)(2,7-di-tert-butyl fluorenyl)zirconium dichloride, phenylmethylmethylene(3-phenyl-5-methylcyclopentadienyl)(3,6-di-tert-butylfluorenyl)zirconium dichloride, phenylmethylmethylene(3-phenyl-5-methylcyclopentadienyl)(octamethyloctahydridodibenzofluorenyl)zirconium dichloride, isopropylidene(3-adamantyl-5-methylcyclopentadienyl)(fluorenyl)zirconium dichloride, isopropylidene(3-adamantyl-5-methylcyclopentadienyl)(2,7-di-tert-butylfluorenyl)zirconium dichloride, isopropylidene(3-adamantyl-5-methylcyclopentadienyl)(3,6-di-tert-butylfluorenyl)zirconium dichloride, isopropylidene(3-adamantyl-5-methylcyclopentadienyl)(octamethyloctahydridodibenzofluorenyl)zirconium dichloride, diphenylmethylene(3-adamantyl-5-methylcyclopentadienyl)(fluorenyl)zirconium dichloride, diphenylmethylene(3-adamantyl-5-methylcyclopentadienyl)(2,7-di-tert-butylfluorenyl)zirconium dichloride, diphenylmethylene(3-adamantyl-5-methylcyclopentadienyl)(3,6-di-tert-butylfluorenyl)zirconium dichloride, diphenylmethylene(3-adamantyl-5-methylcyclopentadienyl)(octamethyloctahydridodibenzofluorenyl)zirconium dichloride, cyclohexylidene(3-adamantyl-5-methylcyclopentadienyl)(fluorenyl)zirconium dichloride, cyclohexylidene(3-adamantyl-5-methylcyclopentadienyl)(2,7-di-tert-butylfluorenyl)zirconium dichloride, cyclohexylidene(3-adamantyl-5-methylcyclopentadienyl)(3,6-di-tert-butylfluorenyl)zirconium dichloride, cyclohexylidene(3-adamantyl-5-methylcyclopentadienyl)(octamethyloctahydridodibenzofluorenyl)zirconium dichloride, phenylmethylmethylene(3-adamantyl-5-methylcyclopentadienyl)(fluorenyl)zirconium dichloride, phenylmethylmethylene(3-adamantyl-5-methylcyclopentadienyl)(2,7-di-tert-butylfluorenyl)zirconium dichloride, phenylmethylmethylene(3-adamantyl-5-methylcyclopentadienyl)(3,6-di-tert-butylfluorenyl)zirconium dichloride, phenylmethylmethylene(3-adamantyl-5-methylcyclopentadienyl)(octamethyloctahydridodibenzofluorenyl)zirconium dichloride, isopropylidene(3-adamantyl-3'-methyl-5-methylcyclopentadienyl)(fluorenyl)zirconium dichloride, isopropylidene(3-adamantyl-3'-methyl-5-methylcyclopentadienyl)(2,7-di-tert-butylfluorenyl)zirconium dichloride, isopropylidene(3-adamantyl-3-methyl-5-methylcyclopentadienyl)(3,6-di-tert-butylfluorenyl)zirconium dichloride, isopropylidene(3-adamantyl-3-methyl-5-methylcyclopentadienyl)(octamethyloctahydridodibenzofluorenyl)zirconium dichloride, diphenylmethylene(3-adamantyl-3-methyl-5-methylcyclopentadienyl)(fluorenyl)zirconium dichloride, diphenylmethylene(3-adamantyl-3-methyl-5-methylcyclopentadienyl)(2,7-di-tert-butylfluorenyl)zirconium dichloride, diphenylmethylene(3-adamantyl-3-methyl-5-methylcyclopentadienyl)(3,6-di-tert-butylfluorenyl)zirconium dichloride, diphenylmethylene(3-adamantyl-3-methyl-5-methylcyclopentadienyl)(octamethyloctahydridodibenzofluorenyl)zirconium dichloride, cyclohexylidene(3-adamantyl-3-methyl-5-methylcyclopentadienyl)(fluorenyl)zirconium dichloride, cyclohexylidene(3-adamantyl-3-methyl-5-methylcyclopentadienyl)(2,7-di-tert-butylfluorenyl)zirconium dichloride, cyclohexylidene(3-adamantyl-3-methyl-5-methylcyclopentadienyl)(3,6-di-tert-butylfluorenyl)zirconium dichloride, cyclohexylidene(3-adamantyl-3-methyl-5-methylcyclopentadienyl)(octamethyloctahydridodibenzofluorenyl)zirconium dichloride, phenylmethylmethylene(3-adamantyl-3-methyl-5-methylcyclopentadienyl)(fluorenyl)zirconium dichloride, phenylmethylmethylene(3-adamantyl-3-methyl-5-methylcyclopentadienyl)(2,7-di-tert-butylfluorenyl)zirconium dichloride, phenylmethylmethylene(3-adamantyl-3-methyl-5-methylcyclopentadienyl)(3,6-di-tert-butylfluorenyl)zirconium dichloride, phenylmethylmethylene(3-adamantyl-3-methyl-5-methylcyclopentadienyl)(octamethyloctahydridodibenzofluorenyl)zirconium dichloride, isopropylidene(3-furyl-5-methylcyclopentadienyl)(fluorenyl)zirconium dichloride, isopropylidene(3-furyl-5-methylcyclopentadienyl)(2,7-di-tert-butylfluorenyl) zirconium dichloride, isopropylidene(3-furyl-5-methylcyclopentadienyl)(3,6-di-tert-butylfluorenyl) zirconium dichloride, isopropylidene(3-furyl-5-methylcyclopentadienyl) (octamethyloctahydridodibenzofluorenyl)zirconium dichloride, diphenylmethylene(3-furyl-5-methylcyclopentadienyl)(fluorenyl)zirconium dichloride, diphenylmethylene (3-furyl-5-methylcyclopentadienyl)(2,7-di-tert-butylfluorenyl)zirconium dichloride, diphenylmethylene(3-furyl-5-methylcyclopentadienyl)(3,6-di-tert-butylfluorenyl) zirconium dichloride, diphenylmethylene(3-furyl-5-methylcyclopentadienyl) (octamethyloctahydridodibenzofluorenyl)zirconium dichloride, cyclohexylidene(3-furyl-5-methylcyclopentadienyl)(fluorenyl)zirconium dichloride, cyclohexylidene(3-furyl-5-methylcyclopentadienyl)(2,7-di-tert-butylfluorenyl) zirconium dichloride, cyclohexylidene(3-furyl-5-methylcyclopentadienyl)(3,6-di-tert-butyl-fluorenyl) zirconium dichloride, cyclohexylidene(3-furyl-5-methylcyclopentadienyl) (octamethyloctahydridodibenzofluorenyl)zirconium dichloride, phenylmethylmethylene(3-furyl-5-methylcyclopentadienyl)(fluorenyl)zirconium dichloride, phenylmethylmethylene(3-furyl-5-methylcyclopentadienyl)(2,7-di-tert-butylfluorenyl)zirconium dichloride, phenylmethylmethylene(3-furyl-5-methylcyclopentadienyl) (3,6-di-tert-butylfluorenyl)zirconium dichloride, phenylmethylmethylene(3-furyl-5-methylcyclopentadienyl)(octamethyloctahydridodibenzofluorenyl)zirconium dichloride, isopropylidene(3-thienyl-5-methylcyclopentadienyl)(fluorenyl)zirconium dichloride, isopropylidene(3-thienyl-5-methylcyclopentadienyl)(2,7-di-tert-butylfluorenyl)zirconium dichloride, isopropylidene(3-thienyl-5-methylcyclopentadienyl)(3,6-di-tert-butylfluorenyl)zirconium dichloride, isopropylidene(3-thienyl-5-methylcyclopentadienyl)(octamethyloctahydridodibenzofluorenyl)zirconium dichloride, diphenylmethylene(3-thienyl-5-methylcyclopentadienyl) (fluorenyl)zirconium dichloride, diphenylmethylene(3-thienyl-5-methylcyclopentadienyl)(2,7-di-tert-butylfluorenyl) zirconium dichloride, diphenylmethylene(3-thienyl-5-methylcyclopentadienyl)(3,6-di-tert-butylfluorenyl) zirconium dichloride, diphenylmethylene(3-thienyl-5-methylcyclopentadienyl) (octamethyloctahydridodibenzofluorenyl)zirconium dichloride, cyclohexylidene(3-thienyl-5-methylcyclopentadienyl)(fluorenyl)zirconium dichloride, cyclohexylidene(3-thienyl-5-methylcyclopentadienyl)(2,7-di-tert-butylfluorenyl)zirconium dichloride, cyclohexylidene(3-thienyl-5-methylcyclopentadienyl)(3,6-di-tert-butylfluorenyl) zirconium dichloride, cyclohexylidene(3-thienyl-5-methylcyclopentadienyl) (octamethyloctahydridodibenzofluorenyl)zirconium dichloride, phenylmethylmethylene(3-thienyl-5-methylcyclopentadienyl)(fluorenyl)zirconium dichloride, phenylmethylmethylene(3-thienyl-5-methylcyclopentadienyl)(2,7-di-tert-butylfluorenyl)zirconium dichloride, phenylmethylmethylene(3-thienyl-5-methylcyclopentadienyl)(3,6-di-tert-butylfluorenyl)zirconium dichloride, phenylmethylmethylene(3-thienyl-5-methylcyclopentadienyl) (octamethyloctahydridodibenzofluorenyl)zirconium dichloride, dibromide compounds of these metallocene compounds, dialkyl compounds these metallocene compounds and dialkoxy compounds of these metallocene compounds, and metallocene compounds having the structure of the above compounds in which the central metal is replaced with hafnium or titanium. However, the invention is not limited to the above examples.

Examples of the organoaluminum oxy compound (b-1) that may be used in the invention include conventionally known aluminoxanes or benzene-insoluble organoaluminum oxy compounds as illustrated in JP-A No. 2-78687. The conventionally known aluminoxanes can be prepared by, for example, the following methods and is typically obtained as a solution of a hydrocarbon solvent.

(1) A method of adding an organoaluminum compound such as trialkylaluminum to a hydrocarbon medium in which a compound containing adsorbed water or a salt containing crystallization water, such as magnesium chloride hydrate, copper sulfate hydrate, aluminum sulfate hydrate, nickel sulfate hydrate or cerous chloride hydrate is suspended, and then allowing the organoaluminum compound to react with the adsorbed water or the crystallization water.

(2) A method of allowing water, ice or vapor to directly act on an organoaluminum compound such as trialkylaluminum in a medium such as benzene, toluene, diethyl ether or tetrahydrofuran.

(3) A method of allowing an organotin oxide such as dimethyltin oxide or dibutyltin oxide to react with an organoaluminum compound such as trialkylaluminum in a medium such as decane, benzene or toluene.

Additionally, the aluminoxane may contain a small amount of an organometallic component. Further, it is also possible to remove the solvent or an unreacted organoaluminum compound by distillation from the recovered solution of aluminoxane, and re-dissolve or suspend the remainder in a poor solvent with respect to the aluminoxane. Specific examples of the organoaluminum compound to be used for preparing aluminoxanes include those as illustrated hereinafter as organoaluminum compounds (c). Among these, trialkylaluminum and tricycloalkylaluminum are preferred, and trimethylaluminum is particularly preferred. These organoaluminum compounds may be used alone or in combination of two or more kinds.

Further, the benzene-insoluble organoaluminum oxy compound that may be used in the invention typically includes an Al component that dissolves in benzene at 60° C. in an amount of 10% or less, preferably 5% or less, and particularly preferably 2% or less, in terms of Al atoms. Namely, the organoaluminum oxy compound is preferably insoluble or poorly soluble in benzene. These organoaluminum oxy compounds may be used alone or in combination of two or more kinds.

Examples of the compound (2b) which reacts with the transition metal compound (1a) to form an ion pair include Lewis acid, ionic compounds, borane compounds and carborane compounds described in JP-A Nos. 1-501950, 1-502036, 3-179005, 3-179006, 3-207703, 3-207704, U.S. Pat. No. 5,321,106, and the like. Heteropoly compounds and isopoly compounds may also be mentioned. These compounds (2b) which react with the transition metal compound (1a) to form an ion pair may be used alone or in combination of two or more kinds. When an organoaluminum oxy compound (1b) such as methylaluminoxane is used as a co-catalyst component in combination with the above-mentioned transition metal compound (1a) as a catalyst for olefin polymerization, a particularly high polymerization activity with respect to an olefin compound can be attained.

Specific examples of the organoaluminum compound (c) that may be used in the invention include an organoaluminum compound represented by the following formula.

$$R^a{}_m Al(OR^b)_n H_p X_q$$

In the formula, $R^a$ and $R^b$ are a hydrocarbon group having from 1 to 15 carbon atoms, preferably from 1 to 4 carbon atoms, that may be the same or different; X represents a halogen atom; m is a number that satisfies $0<m\leq 3$, n is a number that satisfies $0\leq n<3$ and q is a value that satisfies $0\leq q<3$; and $m+n+p+q=3$.

Specific examples of the compounds represented by the above formula include trimethylaluminum, triethylaluminum, triisobutylaluminum and diisobutylaluminum hydride.

The propylene/1-butene random copolymer (B) of the invention is used in an amount of from 1 to 30 parts by weight, preferably from 3 to 25 parts by weight, more preferably from 5 to 20 parts by weight, with respect to 100 parts by weight of the total amount of the non-crosslinkable crystalline polyolefin resin (A), the propylene/1-butene random copolymer (B) and the ethylene/α-olefin/non-conjugated polyene copolymer rubber (C) composed of ethylene, α-olefin containing from 3 to 20 carbon atoms, and non-conjugated polyene.

The propylene/1-butene random copolymer (B) of the invention may be added to a thermoplastic elastomer by dry blending before molding, or may be melt-mixed in a thermoplastic elastomer using an extruder, in place of adding the same during dynamic crosslinking Ethylene/α-Olefin/Non-Conjugated Polyene Copolymer Rubber (C)

The ethylene/α-olefin/non-conjugated polyene copolymer rubber (C) used in the invention is a rubber composed of ethylene, an α-olefin having from 3 to 20 carbon atoms, and a non-conjugated polyene.

Specific examples of the α-olefin having from 3 to 20 carbon atoms include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1,1'-methyldodecene-1 and 12-ethyltetradecene-1. Among these compounds, propylene, 1-butene, 4-methylpenetene-1,1-hexene and 1-octene are preferred. Among these, propylene is particularly preferred.

These α-olefins may be used alone or in combination of two or more kinds. Further, specific examples of the non-conjugated polyene include non-conjugated dienes having a chain structure such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, and 4-ethylidene-1,7-undecanediene; non-conjugated dienes having a cyclic structure such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nonadiene. These may be used in combination of two or more kinds. In particular, a combination of 5-ethylidene-2-norbornene and 5-vinyl-2-norbornene is preferred.

The ethylene/α-olefin/non-conjugated polyene copolymer rubber (C) used in the invention includes (a) a unit derived from ethylene and (b) a unit derived from α-olefin having from 3 to 20 carbon atoms, at a molar ratio ((a)/(b)) of preferably from 40/60 to 95/5, more preferably from 60/40 to 80/20, still more preferably from 65/35 to 75/25.

The iodine value, which is an indicator of the content of the non-conjugated polyene in the ethylene/α-olefin/non-conjugated polyene copolymer rubber (C) used in the invention, is preferably from 1 to 50, more preferably from 5 to 40, still more preferably from 10 to 30. Further, the total amount of the non-conjugated diene with respect to the component (C) is preferably from 2 to 20% by weight.

The intrinsic viscosity of the ethylene/α-olefin/non-conjugated polyene copolymer rubber (C) to be used in the invention as measured at 135° C. in decalin is preferably from 1.0 to 10.0 dl/g, more preferably from 1.5 to 8.0 dl/g.

The ethylene/α-olefin/non-conjugated polyene copolymer rubber (C) used in the invention may be a so-called oil extended rubber in which a softener, preferably a mineral oil-based softener, is blended during production. Examples of the mineral oil-based softener include conventionally known mineral oil-based softeners, such as a paraffin-based process oil.

Also, the Mooney viscosity ($ML_{1+4}(100°$ C.)) of the ethylene/α-olefin/non-conjugated polyene copolymer rubber (C) used in the invention is usually from 10 to 250, preferably from 30 to 150.

The ethylene/α-olefin/non-conjugated polyene copolymer rubber (C) used in the invention may be produced by a conventionally known method. As necessary, an ethylene/α-olefin copolymer rubber may be blended therein.

The α-olefin that constitutes the above-mentioned ethylene/α-olefin copolymer rubber may be the same as the α-olefin having from 3 to 20 carbon atoms that constitutes the ethylene/α-olefin/non-conjugated polyene copolymer rubber (C) used in the invention. The content of the unit derived from ethylene (ethylene content) in the ethylene/α-olefin copolymer rubber is 50 mol % or more, typically from 50 to 90 mol %, preferably from 60 to 85 mol %, and the content of the unit derived from α-olefin having from 3 to 20 carbon atoms (α-olefin content) is 50 mol % or less, typically from 50 to 10 mol %, preferably 40 to 15 mol %.

The ethylene/α-olefin/non-conjugated polyene copolymer (C) is used in an amount of from 89 to 10 parts by weight, preferably from 84.5 to 25 parts by weight, more preferably from 80 to 40 parts by weight, with respect to 100 parts by weight of the total amount of the non-crosslinkable crystalline polyolefin resin (A), the propylene/1-butene random copolymer (B) and the ethylene/α-olefin/non-conjugated polyene copolymer rubber (C).

Thermoplastic Elastomer Composition

The thermoplastic elastomer composition according to the invention can be prepared by dynamically heat-treating a blend composed of the above-mentioned components (A), (B) and (C) in the presence or absence of a crosslinking agent. The term "dynamically heat-treating" as used herein refers to kneading the composition in a molten state (hereinafter, the same will apply).

Crosslinking agents that may be used in the invention include, for example, organic peroxides, sulfur, sulfur compounds, and phenol-based vulcanizing agents such as a phenol resin. Among these compounds, organic peroxides are preferably used.

Specific examples of the organic peroxide include dicumyl peroxide, di-tert-butyl peroxide, 2,5-dimethyl-2,5-di-(tert-butylperoxy)hexane, 2,5-dimethyl-2,5-di(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Among these compounds, 2,5-dimethyl-2,5-di(tert-butylperoxy)hexane, 2,5-dimethyl-2,5-di(tert-butylperoxy)hexine-3, 1,3-bis(tert-butylperoxyisopropyl)benzene, 1,1-bis(tert-butylperoxy)-3,3,5-trimethylcyclohexane and n-butyl-4,4-bis(tert-butylperoxy) valerate are preferred from the viewpoint of odors and scorching characteristics, and 1,3-bis(tert-butylperoxyisopropyl)benzene is most preferred.

This organic peroxide is used at a ratio of typically from 0.01 to 0.15 parts by weight, preferably from 0.03 to 0.12 parts by weight, with respect to 100 parts by weight of the total amount of the non-crosslinkable crystalline polyolefin resin (A), propylene/1-butene random copolymer (B) and ethylene/α-olefin/non-conjugated polyene copolymer rubber (C). When the organic peroxide is used at the above-mentioned ratio, it is possible to obtain a thermoplastic elastomer composition in which the copolymer rubber (C) is crosslinked, and a molded product having satisfactory rubber characteristics such as heat resistance, tensil characteristics, elasticity recovery characteristics and impact resilience, and having a sufficient level of strength. Further, it is possible to obtain a composition having excellent molding properties.

In the invention, when conducting a crosslinking treatment using the above organic peroxide, the crosslinking reaction can proceed in a uniform and moderate manner by compounding a crosslinking aid such as sulfur, p-quinonedioxime, p,p-dibenzoylquinonedioxime, N-methyl-N,4-dinitrosoaniline, nitrobenzene, diphenylguanidine and trimethylolpropane-N,N-m-phenylenedimaleimide; a polyfunctional methacrylate monomer such as divinylbenzene, triallyl cyanurate, ethylene glycol dimethacrylate, diethylene glycol dimethacrylate, polyethylene glycol dimethacrylate, trimethylolpropane trimethacrylate and allylmethacrylate; or a polyfunctional vinyl monomer such as vinylbutyrate and vinyl stearate. In particular, divinylbenzene is most preferred since this compound is easy to handle and exhibits a favorable compatibility with the non-crosslinkable crystalline polyolefin (A), propylene/1-butene random copolymer (B) and ethylene/α-olefin/non-conjugated polyene copolymer rubber (C), which are major components of the aforementioned materials to be treated. Further, the compound has an ability of solubilizing an organic peroxide and functions as a dispersion aid for the organic peroxide, thereby enabling formation of a composition that achieves a uniform crosslinking effect by the heat treatment and a good balance between fluidity and physical properties.

During performing dynamic crosslinking of the thermoplastic elastomer composition of the invention, a softening agent may be added as an agent for adjusting the fluidity or hardness of the composition.

Examples of the softening agent include petroleum-based softening agents, such as process oils, lubricating oils, paraffins, liquid paraffins, polyethylene wax, polypropylene wax, petroleum asphalt and vaseline; coal tar-based softening agents such as coal tar and coal tar pitch; fatty oil-based softening agents such as castor oil, linseed oil, rapeseed oil, soybeen oil and palm oil; tall oil; rubber substitute (factice); waxes such as beeswax, carnauba wax and lanoline; fatty acids such as ricinoleic acid, palmitic acid, stearic acid, barium stearate, calcium stearate and zinc laurate, and salts thereof; naphthenic acid; pine oil, rosin or derivatives thereof; synthetic polymeric substances such as terpene resin, petroleum resin, cumarone-indene resin and atactic polypropylene; ester-based softening agents such as dioctyl phthalate, dioctyl adipate and dioctyl sebacate; and others including microcrystalline wax, liquid polybutadiene, modified liquid polybutadiene, liquid polyisoprene, terminal-modified polyisoprene, hydrogenated terminal-modified polyisoprene, liquid Thiokol and hydrocarbon-based synthetic lubricating oil. Among these, petroleum-based softening agents, particularly process oil, are preferably used.

In the invention, the softening agent is preferably included in the composition in an amount of preferably from 1 to 200 parts by weight, with respect to 100 parts by weight of the total amount of the non-crosslinkable crystalline polyolefin resin (A), propylene/1-butene random copolymer (B) and ethylene/α-olefin/non-conjugated polyene copolymer rubber (C).

The dynamic heat treatment in the invention is preferably conducted in a closed apparatus, preferably in an inert gas atmosphere such as a nitrogen or carbonic acid gas.

The kneading temperature during the dynamic heat treatment is typically from 150 to 280° C., preferably from 170 to 240° C., and the kneading time is typically from 1 to 20 minutes, preferably from 3 to 10 minutes. The shear force to be applied during the kneading in terms of a shear rate is typically from 10 to 100,000 $sec^{-1}$, preferably from 100 to 50,000 $sec^{-1}$.

The kneading apparatus may be a mixing roll, an intensive mixer (such as a Bumbury's mixer or a kneader), a single-screw extruder, a twin-screw extruder or the like, but a closed apparatus is preferred.

In the thermoplastic elastomer composition of the invention, as necessary, an additive such as a blowing agent, a nucleating agent, a slip agent, a filler, an antioxidant, a weathering stabilizer or a colorant may be included at an amount within such a range that the object of the invention is not impaired.

Specific examples of the blowing agent include inorganic blowing agents such as sodium bicarbonate (sodium hydrogen carbonate), sodium carbonate, ammonium bicarbonate, ammonium carbonate and ammonium nitrite; nitroso compounds such as N,N-dimethyl-N,N-dinitrosoterephthalamide and N,N-dinitrosopentamethylenetetramine (DPT); azo compounds such as azodicarbonamide (ADCA), azobisisobutylonitrile (AZBN), azobiscyclohexylnitrile, azodiaminobenzene and barium azodicarboxylate; sulfonyl hydrazide compounds such as benzene sulfonyl hydrazide (BSH), toluene sulfonyl hydrazide (TSH), p,p-oxybis(benzene sulfonyl hydrazide)(OBSH) and diphenylsulfone-3,3-disulfonyl hydrazide; and azide compounds such as calcium azide, 4,4-diphenyldisulfonyl azide and p-toluenesulfonyl azide.

A molded product or a blow-molded product formed from the thermoplastic elastomer composition according to the invention may be joined to an object such as a molded product of an optionally blown vulcanized rubber and/or a molded product of an optionally blown thermoplastic elastomer. Formation of the blow-molded product formed from the thermoplastic elastomer composition of the invention can be conducted according to a known method using a blowing agent which is used in producing a blown body of rubber or elastomer.

Examples of the nucleating agent include non-melting and melting crystallization nucleating agents. These may be used alone or in combination of two or more kinds. Examples of the non-melting crystallization nucleating agent include inorganic substances such as talc, mica, silica and aluminum; brominated biphenyl ether, aluminum hydroxy-di-p-tert-butylbenzoate (TBBA), organic phosphoric acid salts, rosin-based crystallization nucleating agents, substituted triethylene glycol terephthalate and Terylene & Nylon fibers. In particular, aluminum hydroxy-di-p-tert-butylbenzoate, sodium methylenebis(2,4-di-tert-butylphenyl)phosphate, sodium 2,2'-methylenbis(4,6-di-tert-butylphenyl)phosphate and rosin-based crystallization nucleating agents are desirable. Examples of the melting crystallization nucleating agent include sorbitol-based compounds such as dibenzylidenesorbitol (DBS), substituted DBS and lower alkyldibenzylidenesorbitol (PDTS).

Examples of the slip agent include aliphatic acid amides, silicone oils, glycerin, waxes and paraffin-based oils.

Examples of the filler include conventionally known fillers, specifically, carbon black, clay, talc, calcium carbonate, kaolin, diatomaceous earth, silica, alumina, graphite and glass fibers.

Vulcanized Rubber Molded Product

The vulcanized rubber that forms a molded product to which the thermoplastic elastomer composition according to the invention is to be welded is preferably an ethylene/α-olefin/polyene copolymer rubber, from the viewpoint of weldability with respect to the thermoplastic elastomer composition. One preferable example of such a copolymer rubber is an ethylene/α-olefin(/non-conjugated polyene) copolymer rubber.

The vulcanized rubber as used herein includes not only a rubber that is crosslinked using sulfur, but also a rubber that is crosslinked using a crosslinking agent of other kinds.

The thermoplastic elastomer composition according to the invention is favorably used as a corner member to be welded to a molded product of a vulcanized rubber (preferably a polyolefin-based vulcanized rubber) that is used as an interior/exterior member of a vehicle, for example, a corner member of a weather strip of an automobile. Specifically, in the process of molding a corner portion at which members obtained by cutting an extruded molded product of polyolefin-based vulcanized rubber are joined from different directions, a weather strip can be formed by injection-molding the thermoplastic elastomer composition according to the invention at a temperature that is equal to or higher than the melting point of the composition, and then contacting and welding the same to the extruded molded product of vulcanized rubber.

The weather strip having a corner portion molded product formed from the thermoplastic elastomer composition according to the invention will be described more specifically, by referring to FIGS. 1 and 2.

Figure 2:
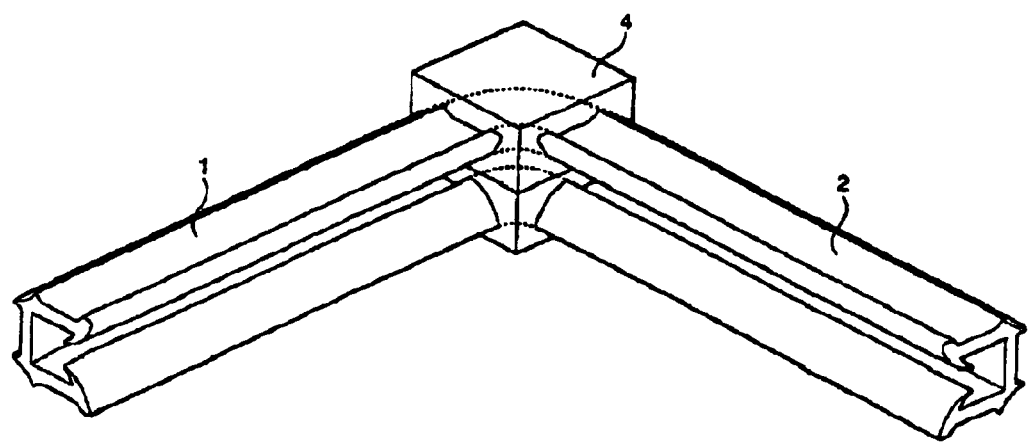
FIG. 2 is a schematic perspective view that illustrates the method of forming the corner portion of the weather strip.

FIGS. 1 and 2 are schematic perspective views illustrating a weather strip (glass run channel) for an automobile and a method of molding the same.

As shown in FIG. 1, the weather strip is composed of cut-and-extruded molded products 1 and 2 made of vulcanized rubber formed by cutting and extruding, and a joint corner member 3 that is formed at the time of connecting the cut-and-extruded molded products 1 and 2 from different directions. The cut-and-extruded molded products 1 and 2 are obtained by subjecting the vulcanized rubber to extrusion molding in the shape of a channel, and then cutting the same to a predetermined length. The cut-and-extruded molded products 1 and 2 have a straight-line shape in a longitudinal direction. The term "joint corner member" as used herein refers to a portion made of the thermoplastic elastomer that is formed during connecting the molded products to each other from different directions. The weather strip shown in FIG. 1 can be prepared in the following manner.

First, a mold 4 for injection molding is previously heated to a predetermined temperature. Next, as shown in FIG. 2, the cut-and-extruded molded products 1 and 2 formed from vulcanized rubber are inserted into the mold 4.

Then, though not shown, the thermoplastic elastomer composition according to the invention that is melted at a temperature that is equal to or higher than the melting point thereof in a heating chamber (in a screw) is injected into a space formed between the cavity and the core of mold 4, and is welded to end surfaces of cut-and-extruded molded products 1 and 2 at a temperature that is equal to or higher than the melting point. Then, the thermoplastic elastomer composition is cooled and the weather strip having the corner member 3 shown in FIG. 1 is obtained.

The vulcanized rubber to be used for preparing the above-mentioned cut-and-extruded molded memberes 1 and 2 preferably includes an ethylene/α-olefin/non-conjugated polyene copolymer rubber as a main component, and examples of the α-olefin having from 3 to 20 carbon atoms in the ethylene/α-olefin/non-conjugated polyene copolymer rubber include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentdecene, 1-hexadecene, 1-heptadecene, 1-nonadecene, 1-eicosene, 9-methyldecene-1,1'-methyldodecene-1, and 12-ethyltetradecene-1. These α-olefins may be used alone or in combination of two or more kinds. Among these α-olefins, an α-olefin having from 3 to 8 carbon atoms, such as propylene, 1-butene, 4-methyl-pentene-1,1-hexene and 1-octene are particularly preferred.

The above-mentioned ethylene/α-olefin/non-conjugated polyene copolymer rubber includes (a) a unit derived from ethylene and (b) a unit derived from α-olefin having from 3 to 20 carbon atoms at a molar ratio ((a)/(b)) of preferably from 50/50 to 90/10, from the viewpoint of obtaining a rubber composition that can provide a vulcanized rubber molded product having excellent heat-aging resistance, strength characteristics, rubber elasticity, low-temperature resistance and processability. This molar ratio is more preferably from 65/35 to 90/10, still more preferably from 65/35 to 85/15, particularly preferably from 65/35 to 80/20.

Examples of the non-conjugated polyene include chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes such as 2,3-diisopropylidene-5-norbornene, 2-ethylidene-3-isopropylidene-5-norbornene, 2-propenyl-2,2-norbornadiene and 4-ethylidene-8-methyl-1,7-nonadiene. Among these, 5-ethylidene-2-norbornene, 5-vinyl-2-norbornene, cyclopentadiene and 4-ethylidene-8-methyl-1,7-nonadiene are preferred. These may be used alone or in combination of two or more kinds.

The iodine value of the above-mentioned ethylene/α-olefin/non-conjugated polyene copolymer rubber is preferably from 1 to 40, more preferably from 1 to 30, from the viewpoint of obtaining a rubber composition that exhibits a high level of crosslinking efficiency and can provide a vulcanized rubber molded product that exhibits excellent resistance to permanent compression set, and from the viewpoint of cost efficiency.

The intrinsic viscosity (η) of the above-mentioned ethylene/α-olefin/non-conjugated polyene copolymer rubber as measured in decalin at 135° C. is preferably from 2.0 to 4.5 dl/g, more preferably from 2.2 to 4.0 dl/g, from the viewpoint of obtaining a rubber composition that can provide a vulcanized rubber molded product having excellent strength characteristics, resistance to permanent compression set and processability. The ethylene/α-olefin/non-conjugated polyene copolymer rubber may be used alone or in combination of two or more kinds.

In order to obtain an extruded, vulcanized rubber molded product having a sufficient mechanical strength, carbon black is preferably used in the vulcanized rubber in an amount of from 30 to 300 parts by weight with respect to 100 parts by weight of the ethylene/α-olefin/non-conjugated polyene copolymer rubber.

Examples of the carbon black that may be used include SRF, GPF, FEF, MAF, HAF, ISAF, SAF, FT and MT. The carbon black preferably has a nitrogen adsorption specific surface area of from 10 to 100 $m^2/g$, from the viewpoint of obtaining a rubber composition that can provide a vulcanized rubber molded product having favorable mechanical strength and product texture.

Depending on the intended use of the vulcanized product, conventionally known compounding agents such as an anti-aging agent, a processing aid, a blowing agent, a blowing aid, a colorant, a dispersing agent, and a fire retardant may be blended.

Further, inorganic fillers may be used in the vulcanized rubber as a reinforcing agent, as appropriate according to usage, and the amount thereof is typically up to 100 parts by weight, with respect to 100 parts by weight of the ethylene/α-olefin/non-conjugated polyene copolymer rubber.

Example of the inorganic filler include silica, soft calcium carbonate, heavy calcium carbonate, talc and clay.

The softening agent to be blended in the vulcanized rubber may be a softening agent typically used in rubbers. Specific examples thereof include petroleum-based softening agents, such as process oils, lubricating oils, paraffins, liquid paraffins, polyethylene wax, polypropylene wax, petroleum asphalt and vaseline; coal tar-based softening agents such as coal tar and coal tar pitch; fatty oil-based softening agents such as castor oil, linseed oil, rapeseed oil, soybean oil and palm oil; tall oil; rubber substitute (factice); waxes such as beeswax, carnauba wax and lanoline; fatty acids such as ricinoleic acid, palmitic acid, stearic acid, barium stearate, calcium stearate and zinc laurate, and salts thereof; naphthenic acid; pine oil, rosin and derivatives thereof; synthetic polymeric substances such as terpene resin, petroleum resin, cumarone-indene resin and atactic polypropylene; ester-based softening agents such as dioctyl phthalate, dioctyl adipate and dioctyl sebacate; and others including microcrystalline wax, liquid polybutadiene, modified liquid polybutadiene, liquid polyisoprene, terminal-modified polyisoprene, hydrogenated terminal-modified polyisoprene, liquid Thiokol and hydrocarbon-based synthetic lubricating oil. Among these, petroleum-based softening agents, particularly process oil, are preferably used. The amount of the softening agent to be blended may be appropriately selected according to the use of the vulcanized product.

The vulcanizing agents used for vulcanization of the vulcanized rubber include sulfur and sulfur compounds. Specifically, the sulfur may be powder sulfur, precipitated sulfur, colloidal sulfur, surface-treated sulfur, insoluble sulfur, or the like.

Specific examples of the sulfur compound include sulfur chloride, sulfur dichloride and high-molecular polysulfide. It is also possible to use a sulfur compound that performs vulcanization by releasing active sulfur at a vulcanization temperature, such as morpholine disulfide, alkylphenol disulfide, tetramethylthiuram disulfide, dipentamethylenethiuram tetrasulfide, and selenium dimethyldithiocarbamate. Among these, sulfur is preferable.

Sulfur or a sulfur compound is typically used at the ratio of from 0.1 to 10 parts by weight with respect to 100 parts by weight of the copolymer rubber as described above.

When using sulfur or a sulfur compound as a vulcanizing agent, a vulcanization accelerators is preferably used in combination. Specific examples of the vulcanization accelerator include sulfenamide compounds such as N-cyclohexyl-2-benzothiazolesulfenamide (CBS), N-oxydiethylene-2-benzothiazolesulfenamide (OBS), N-t-butyl-2-benzothiazole-sulfenamide (BBS) and N,N-diisopropyl-2-benzothiazolesulfenamide; thiazole compounds such as 2-mercaptobenzothiazole (MBT), 2-(2,4-dinitrophenyl)mercaptobenzothiazole, 2-(4-morpholinothio)benzothiazole, 2-(2,6-diethyl-4-morpholinothio)benzothiazole and dibenzothiazyldisulfide; guanidine compounds such as diphenylguanidine (DPG), triphenylguanidine, diorthonitolylguanidine (DOTG), orthotolylbiguanide and diphenylguanidine phthalate; aldehyde amine or aldehyde-ammonia compounds such as acetaldehyde-aniline condensed compounds, butylaldehyde-aniline condensed compounds, hexamethylenetetramine (H) and acetaldehyde ammonia; imidazoline compounds such as 2-mercaptoimidazoline; thiourea compounds such as thiocarbanilide, diethylthiourea (EUR), dibutylthiburea, trimethylthiourea and diorthotolylthiourea; thiuram compounds such as tetramethylthiuram monosulfide (TMTM), tetramethylthiuram disulfide (TMTD), tetraethylthiuram disulfide, tetrabutylthiuram disulfide, tetrakis(2-ethylhexyl)thiuram disulfide (TOT) and dipentamethylenetetrathiuram sulfide (TRA); salts of dithiocarbamic acid such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthathogenic acid salts such as zinc dibutylxanthate; and zinc white (zinc oxide).

These vulcanization accelerators are typically used at a ratio of from 0.1 to 20 parts by weight with respect to 100 parts by weight of the copolymer rubber as described above.

Examples of the anti-aging agent to be used in the vulcanized rubber include amine-based anti-aging agents, hindered phenol-based anti-aging agents and sulfur-based anti-aging agents. These anti-aging agents are used at such an amount that does not impair the object of the invention.

The amine-based anti-aging agents include diphenylamines and phenylenediamines.

The sulfur-based anti-aging agents include those typically used in rubbers.

The processing aids include those typically used for processing a rubber. Specific examples thereof include higher fatty acids such as linoleic acid, ricinoleic acid, stearic acid, palmitic acid and lauric acid; salts of higher fatty acid such as barium stearate, zinc stearate, calcium stearate; and esters of these higher fatty acids.

The processing aid is typically used in an amount of not more than 10 parts by weight with respect to 100 parts by weight of the ethylene/α-olefin/non-conjugated polyene copolymer rubber, but is preferably determined as appropriate according to the required physical properties.

Examples of the blowing agent include inorganic blowing agents such as sodium bicarbonate (sodium hydrogen carbonate), sodium carbonate, ammonium bicarbonate, ammonium carbonate and ammonium nitrite; nitroso compounds such as N,N-dimethyl-N,N-dinitrosoterephthalamide and N,N-dinitrosopentamethylenetetramine (DPT); azo compounds such as azodicarbonamide (ADCA), azobisisobutylonitrile (AZBN), azobiscyclohexylnitrile, azodiaminobenzene and barium azodicarboxylate; sulfonyl hydrazide compounds such as benzenesulfonyl hydrazide (BSH), toluene sulfonyl hydrazide (TSH), p,p-oxybis(benzenesulfonyl hydrazide) (OBSH) and diphenyl sulfone-3,3-disulfonyl hydrazide; and azide compounds such as calcium azide, 4,4-diphenyl disulfonyl azide and p-toluenesulfonyl azide.

The vulcanized rubber components may further include a conventionally known rubber or resin of other kinds.

Examples of the rubber of other kinds include natural rubber (NR), isoprene-based rubbers such as isoprene rubber (IR), conjugated diene-based rubbers such as butadiene rubber (BR), styrene-butadiene rubber (SBR), acrylonitrile-butadiene rubber (NBR) and chloroprene rubber (CR).

Examples of the resin of other kinds include polyethylene, polypropylene, 1,2-polybutadiene and polybutene.

<Preparation of Rubber Composition and Vulcanized Rubber Molded Product Thereof>

The rubber composition used in the preparation of the above-mentioned vulcanized rubber molded product can be prepared by kneading an ethylene/α-olefin/non-conjugated polyene copolymer rubber, carbon black, and optionally an additive such as a rubber reinforcing agent, inorganic filler or a softening agent, using an internal mixer (closed mixer) such as a Bumbury's mixer, a kneader or an intermix at a temperature of from 80 to 170° C. for 2 to 20 minutes; adding sulfur using a roll such as an open role or a kneader, and optionally adding a vulcanization accelerator, a vulcanization aid, a blowing agent or a blowing aid; mixing the composition at a roll temperature of from 40 to 80° C. for 5 to 30 minutes; and then sheeting out the composition.

The rubber composition for extrusion molding as prepared by the above process can be vulcanized by heating at from 140 to 300° C. for 1 to 20 minutes at the time of forming the composition into a desired shape using an extruder, or at the time of introducing the molded composition into a vulcanization chamber.

The process of vulcanization is typically carried out in a sequential manner. The heating in a vulcanization chamber may be carried out using a heating means such as a hot air, a fluidized bed of glass beads, a molten salt bath (LCM), a PCM (Powder Curing Medium or Powder Curing Method), a UHF (ultra high frequency microwave), or a steam.

In the present specification, the thermoplastic elastomer composition according to the invention is described taking a weather strip as an example. However, the thermoplastic elastomer composition according to the invention is also applicable to the formation of a surface layer of a door trim or the like from a welded coating layer, as well as the formation of a molded product to be welded to a molded product of vulcanized rubber.

Thermoplastic Elastomer Molded Product

The thermoplastic elastomer for a molded product to which the thermoplastic elastomer composition according to the invention is welded may be olefin-based, styrene-based, vinyl chloride-based, urethane-based, ester-based, amide-based or the like, and an olefin-based composition that includes an olefin-based resin and a partially or totally crosslinked olefin-based rubber is preferred.

<Olefin-Based Resin>

The olefin-based resin used as a component of the aforementioned thermoplastic elastomer molded product is a crystalline, high-molecular solid product obtained by polymerizing one or more kinds of mono-olefins by either a high-pressure method or a low-pressure method. These olefin-based resins include isotactic and syndiotactic mono-olefin polymer resins. These representative resins are commercially available.

Specific examples of the suitable starting olefin for the above olefin-based resin include α-olefins having from 2 to 20 carbon atoms, preferably from 2 to 12 carbon atoms, such as ethylene, propylene, 1-butene, 1-pentene, 1-hexene, 1-octene, 1-decene, 2-methyl-1-propene, 3-methyl-1-pentene, 4-methyl-1-pentene, and 5-methyl-1-hexene. These α-olefins may be used alone or in combination of two or more kinds.

The mode of polymerization is not particularly limited and may be either a random type or a block type, as long as a resinous product can be obtained.

The olefin-based resin is preferably a propylene-based polymer, and specific examples thereof include a propylene homopolymer, a propylene/ethylene block copolymer, a propylene/ethylene random copolymer, and a propylene/ethylene/butene random copolymer.

The melt flow rate (MFR: ASTMD1238-65T, 230° C., 2.16 kg load) of the olefin-based resin is typically in the range of from 0.01 to 100 g/10 min, preferably from 0.05 to 50 g/10 min.

The olefin-based resin plays a part of improving fluidity and heat resistance of the thermoplastic elastomer composition that forms the thermoplastic elastomer molded product. The olefin-based resin may be used alone or in combination of two or more kinds. Though not particularly limited, examples of the olefin-based resin include polypropylene, and polypropylene is particularly preferred.

<Olefin-Based Rubber>

The olefin-based rubber used as a component of the thermoplastic elastomer molded product is not particularly limited, and examples thereof include ethylene/α-olefin/polyene copolymers such as an ethylene/α-olefin/non-conjugated polyene copolymer and an ethylene/α-olefin copolymer.

The ethylene content of the ethylene/α-olefin(/non-conjugated polyene) copolymer is typically from 25 to 95 mol %, preferably from 30 to 90 mol %, still more preferably from 35 to 85 mol %.

The α-olefins include an α-olefin having 2 carbon atoms or from 4 to 20 carbon atoms, as described above, and propylene is particularly preferred. Examples of the non-conjugated polyene include chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecanedione; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nonadiene. Among these, 5-ethylidene-2-norbornene, 5-vinyl-2-norbornene, cyclopentadiene and 4-ethylidene-8-methyl-1,7-nonadiene are preferred.

The iodine value of the above ethylene/α-olefin(/non-conjugated polyene) copolymer rubber is preferably from 1 to 30 g/100 g, more preferably from 3 to 25 g/100 g. Further, the Mooney viscosity ($ML_{1+4}$(100° C.)) of the copolymer rubber (C) is preferably from 10 to 250.

Regarding the proportion of the above olefin-based resin and the olefin-based rubber to be used, the amount of the olefin-based resin is from 10 to 80% by weight, preferably from 15 to 60% by weight, while the amount of the olefin-based rubber is from 90 to 20% by weight, preferably from 85 to 40% by weight, with respect to the total weight of the olefin-based resin and the olefin-based rubber. When the proportion of the olefin-based resin and the olefin-based rubber is within the above range, it is possible to obtain a thermoplastic elastomer composition that exhibits excellent flexibility, rubber elasticity and molding properties.

The softening agents and inorganic fillers that may be used as other components include those typically used for rubbers.

A non-blown or blown thermoplastic elastomer molded product can be formed from the above-mentioned thermoplastic elastomer composition, by a method such as extrusion molding, press molding, injection molding or calender molding.

EXAMPLES

In the following, the invention will be described with reference to the Examples. However, the invention is not limited thereto.

The melt flow rate (MFR) of the thermoplastic elastomer compositions obtained in the Examples and Comparative Examples, and tensile peel strength and elongation before peeling, hardness, tensile strength, and elongation of the molded product formed from the thermoplastic elastomer composition obtained in the Examples and the Comparative examples were measured and evaluated in accordance with the following methods.

(1) Melt Flow Rate (MFR)

The melt flow rate of the thermoplastic elastomer composition was measured in accordance with ASTM D 1238-65T at 230° C. under load of 2.16 kg.

(2) Hardness

The shore A hardness was measured in accordance with JIS K6253.

(Measurement Conditions)

A sheet was produced using a pressing machine, and the hardness was determined by reading the scale of a Type A durometer immediately after contacting the indenter to the sheet.

(3) Tensile Strength and Elongation

The tensile strength and the elongation at break were measured by conducting a tensile test in accordance with JIS K6251 under the following conditions.

(Test Conditions)

A test piece of JIS No. 3 was punched out from a sheet produced using a pressing machine, and the measurement was carried out at a tensile rate of 500 mm/min.

(4) Adhesion Strength and Elongation Before Peeling

A molded product of vulcanized rubber and thermoplastic rubber was obtained by punching out a test piece of JIS No. 3 from a pressed sheet of vulcanized rubber (a flat sheet of 12 cm in length×14.7 cm in width×2 mm in thickness) and a pressed sheet of thermoplastic elastomer (a flat sheet of 12 cm in length×14.7 cm in width×2 mm in thickness) obtained in the Reference Example as described later, respectively. Then, the molded product was cut in half to form an adherend, and this adherend was set in an injection-molding mold. Then, a thermoplastic elastomer composition was injected using a 100-ton injection molding machine at an injection temperature of 250° C. and a mold temperature of 50° C. so that the thermoplastic elastomer composition was welded to the cut surface of the adherend, i.e., the molded product of vulcanized rubber or thermoplastic elastomer, thereby molding the thermoplastic elastomer composition.

The thus-obtained molded product (JIS No. 3 test pieces) was subjected to a peel test at a tensile rate of 200 mm/min, and the tensile peel strength (adhesion strength) at this time and the elongation before peeling were measured.

Reference Example (Preparation of Vulcanized Rubber Pressed Sheet)

100 parts by weight of an ethylene/propylene/5-ethylidene-2-norbornene copolymer rubber as a raw material rubber (ethylene content=68 mol % (ethylene+propylene+diene=100 mol %); diene content=4.5% by weight; iodine value=13; intrinsic viscosity ($\eta$) as measured in decalin at 135° C.=2.8 dl/g), 170 parts by weight of FEF-grade carbon black (manufactured by Asahi Carbon; trade name: ASAHI#60G), 95 parts by weight of a softening agent (manufactured by Idemitsu Kosan Co., Ltd., trade name: DIANA PROCESS OIL™ PS-430), 1 part by weight of stearic acid, 5 parts by weight of zinc white No. 1, and 1 part by weight of a surfactant (manufactured by Lion Corporation, trade name: ARQUAD 2HT-F) were mixed and kneaded in a 1.7-L Banbury mixer (manufactured by Kobe Steel, Ltd., BB-2 mixer).

The kneading was conducted by masticating the raw material rubber for 1 minute, and then adding the carbon black, softening agent, stearic acid, zinc white No. 1 and surfactant and kneading for 2, minutes. Thereafter, the ram was lifted and cleaning was conducted, and the kneading was further carried out for another 2 minutes. 1390 parts by weight of a rubber blend (I) was thus obtained. The kneading was carried out at a filling rate of 75%. Another two batches of the rubber blend were kneaded in the same manner as above, thereby obtaining 4170 parts by weight of the rubber blend (I) in total.

3670 parts by weight of the rubber blend (I) was wrapped around a 14-inch roll (manufactured by Nihon Roll K.K.) (surface temperature of front roll: 60° C., surface temperature of rear roll; 60° C., revolutions of front roll: 16 rpm, revolutions of rear roll: 18 rpm). To this rubber blend (I), 5 parts by weight of sulfur, 15 parts by weight of 2-mercaptobenzothiazol (manufactured by Sanshin Chemical Industries. Co., Ltd.; trade name: SANCELER), 5 parts by weight of dibenzothiazyl disulfide (manufactured by Sanshin Chemical Industries. Co., Ltd.; trade name: SANCELER DM), 20 parts by weight of zinc dibutyldithiocarbamate (manufactured by Sanshin Chemical Industries. Co., LTD.; trade name: SANCELER BZ), 5 parts by weight of zinc dimethyldithiocarbamate (manufactured by Sanshin Chemical Industries. Co., Ltd.; trade name: SANCELER PZ), 10 parts by weight of ethylenethiourea (manufactured by Sanshin Chemical Industries. Co., Ltd.; trade name: SANCELER 22C), 5 parts by weight of dithiodimorpholine (manufactured by Sanshin Chemical Industries. Co., Ltd.; trade name: SANFEL R) and 50 parts by weight of calcium oxide (manufactured by Inoue Sekkai Kogyo K.K.; trade name: VESTA PP) were added and the mixture was kneaded for 7 minutes, thereby obtaining a rubber blend (II).

A pressed vulcanized rubber sheet was prepared from this rubber blend (II) in accordance with the process as described above, using a 150-ton pressing machine.

(Preparation of Thermoplastic Elastomer Pressed Sheet)

60.6 parts by weight of an oil-extended ethylene/propylene/5-ethylidene-2-norbornene copolymer rubber (ethylene content=78 mol % (ethylene+propylene+diene=100 mol %), diene content=4.5% by weight, iodine value=13, intrinsic viscosity ($\eta$) as measured at 135° C. in decalin=3.34 dl/g, oil extension amount: 62 parts by weight of paraffin-based process oil (manufactured by Idemitsu Kosan Co., Ltd., trade name: PW-380) per 100 parts by weight of the rubber; hereinafter abbreviated as "EPT") as a rubber component, 27 parts by weight of a propylene homopolymer (MFR (ASTM D 1238, 230° C., 2.16 kg load): 55 g/10 min, melting point (Tm): 162° C.; hereinafter abbreviated as "PP-1") as polypropylene, 12.4 parts by weight of a propylene homopolymer (MFR (ASTM D 1238, 230° C., 2.16 kg load): 1.5 g/10 minm, melting point (Tm): 160° C.; hereinafter abbreviated as "PP-2") as polypropylene, 2.5 parts by weight of a 40% concentration carbon master batch as a carbon master batch, 0.1 part by weight of a phenol-based antioxidant (manufactured by Ciba-Geigy Japan; trade name: IRGANOX 1010) as an antioxidant, 0.1 part by weight of a diazo weathering stabilizer (trade name: TINUVIN 326; produced by Ciba-Geigy Japan) as a weathering stabilizer, 0.30 parts by weight of an organic peroxide (trade name: PERHEXA 25B; manufactured by NOF Corporation) as a crosslinking agent, and 0.70 parts by weight of divinylbenzene (DVB) as a crosslinking aid were sufficiently mixed in a Henschel mixer.

Subsequently, the mixture was granulated with an extruder (product number: TEM-50T, manufactured by Toshiba Machine Co., Ltd., L/D=40, cylinder temperature: C1-C2=120° C., C3-C4=140° C., C5-C6=180° C., C7-C8=200° C., C9-C12=220° C., dice temperature: 210° C., screw revolutions: 280 rpm, throughput: 40 kg/h) while supplying 21 parts by weight of a paraffin-based process oil (manufactured by Idemitsu Kosan Co., Ltd., trade name: PW-100) to the cylinder, thereby obtaining pellets of the thermoplastic elastomer composition. Then, a 2-mm thick thermoplastic elastomer sheet was prepared using a press molding machine.

(Synthesis of Propylene/1-butene Random Copolymer (PBR-1))

900 ml of dry hexane, 60 g of 1-butene and triisobutylaluminum (1 mmol) were placed in a 2000-ml polymerization apparatus that is thoroughly purged with nitrogen at an ordinary temperature. Then, the internal temperature of the polymerization apparatus was elevated to 70° C., and the pressure was increased to 0.7 MPa using propylene. Subsequently, a toluene solution in which 0.002 mmol of dimethylmethylene (3-tert-butyl-5-methylcyclopentadienyl)fluorenylzirconium chloride had been contacted with 0.6 mmol (in terms of aluminum) of methylaluminoxane (manufactured by Tosoh Finechem Corporation) was added in the polymerization vessel, and the content was allowed to polymerize for 30 minutes while maintaining the internal temperature at 70° C. and the propylene pressure at 0.7 MPa. Then, 20 ml of methanol was added thereto to stop the polymerization. After releasing the pressure, a polymer was allowed to precipitate from the polymerization solution in 2 L of methanol, and the polymer was dried in vacuum at 130° C. for 12 hours. The amount of the thus-obtained polymer was 9.2 g. The melting point of the resulting polymer was 80.6° C. and the intrinsic viscosity ($\eta$) thereof was 1.18 dl/g. Physical properties of the obtained polymer are shown in Table 2.

(Synthesis of Propylene/1-butene Random Copolymer (PBR-2))

Polymerization was conducted in a similar manner to Example 1, except that the amount of hexane was 800 ml, the amount of 1-butene was 120 g, and the internal temperature of the polymerization vessel was 60° C. The weight of the thus-obtained polymer was 10.8 g. The melting point of the resulting polymer was 69.0° C. and the intrinsic viscosity ($\eta$) thereof was 2.06 dl/g. Physical properties of the thus-obtained polymer are shown in Table 2.

(Synthesis of Propylene/1-butene Random Copolymer (PBR-3))

830 ml of hexane and 100 g of 1-butene were placed in a 2 L autoclave that was thoroughly purged with nitrogen. Then, 1 mmol of triisobutylaluminum was added thereto and heated to 70° C. Subsequently, propylene was supplied therein so that the total pressure was 0.7 MPa, and 1 mmol of triethylaluminum and 0.005 mmol (in terms of Ti) of a titanium catalyst that is supported on magnesium chloride were added thereto, and the content was allowed to polymerize for 30 minutes while supplying propylene in a continuous manner to maintain the total pressure at 0.7 Mpa.

The amount of the thus-obtained polymer was 33.7 g. The melting point of the resulting polymer was 110.0° C. and the intrinsic viscosity ($\eta$) was 1.91 dl/g. Physical properties of the thus-obtained polymer are shown in Table 2.

TABLE 2

|  | PBR-1 | PBR-2 | PBR-3 |
|---|---|---|---|
| 1-Butene content (mol %) | 19.1 | 28.0 | 23.1 |
| Intrinsic viscosity ($\eta$) (dl/g) | 1.18 | 2.06 | 1.91 |
| Mw/Mn | 2.04 | 2.15 | 3.40 |
| B value | 1.01 | 1.04 | 0.92 |
| Triad isotacticity (%) | 96 | 95 | 99 |
| Proportion (%) of hetero bonds due to 2,1-insersion | 0.1 | 0.2 | 0.01 |
| Melting point (° C.) | 80.6 | 66.5 | 110.0 |
| 146 exp (−0.022M) | 95.9 | 78.9 | 87.8 |
| 125 exp (−0.032M) | 67.8 | 51.0 | 59.7 |
| 160 exp (−0.020M) | 109.2 | 91.4 | 100.8 |
| 160 exp (−0.022M) | 105.1 | 86.4 | 96.3 |

Example 1

22 parts by weight of polypropylene (MFR (ASTM D 1238, 230° C., 2.16 kg load): 8 g/10 min, melting point (Tm): 140° C.; hereinafter abbreviated as "PP-1") as component (A), 9 parts by weight of the above PBR-1 as component (B), 68 parts by weight of an oil-extended ethylene/propylene/5-ethylidene-2-norbornene copolymer rubber (ethylene content: 57 wt %, diene content: 7.3 wt %, Mooney viscosity ($ML_{1+4}$ (125° C.)): 74, oil extension amount: 50 parts by weight of paraffin-based process oil (manufactured by Idemitsu Kosan Co., Ltd.; trade name: PW-380) per 100 parts by weight of the rubber; hereinafter abbreviated as "EPT") as component (C), 1 part by weight of silicone oil (manufactured by Dow Corning Toray Co., Ltd., trade name: SH200), 2.5 parts by weight of a 40% concentration carbon master batch as a carbon master batch, 0.1 part by weight of a phenol-based antioxidant (trade name: IRGANOX 1010, manufactured by Ciba-Geigy Japan) as an antioxidant, 0.5 parts by weight of a diazo weathering stabilizer (trade name: TINUVIN 326, manufactured by Ciba-Geigy Japan) as a weathering stabilizer, 0.40 parts by weight of an organic peroxide (trade name: PERHEXA 25B, manufactured by NOF Corporation) as a crosslinking agent, and 0.11 parts by weight of diethylene glycol dimethacrylate as a crosslinking aid were sufficiently mixed in a Henschel mixer.

Subsequently, the mixture was granulated using an extruder (product number: TEM-50, manufactured by Toshiba Machine Co., Ltd., L/D=40, cylinder temperature: C1-C2=120° C., C3-C4=140° C., C5-C6=180° C., C7-C8=200° C., C9-C12=220° C., dice temperature: 210° C., screw revolutions: 200 rpm, throughput: 40 kg/h) while supplying 10 parts by weight of a paraffin-based process oil (trade name: PW-380, manufactured by Idemitsu Kosan Co., Ltd.) to the cylinder as a softening agent, thereby obtaining pellets of the thermoplastic elastomer composition.

The thus-obtained thermoplastic elastomer composition pellets were injection-molded, and evaluation of the thus-obtained molded product was conducted in accordance with the aforesaid methods. The results are shown in Table 3.

Example 2

Pellets of a thermoplastic elastomer composition were obtained in a similar manner to Example 1, except that PBR-2 was used in place of PBR-1.

The thus-obtained thermoplastic elastomer composition pellets were injection-molded, and evaluation of the thus-obtained molded product was conducted in accordance with the aforesaid methods. The results are shown in Table 3.

Comparative Example 1

Pellets of a thermoplastic elastomer composition were obtained in a similar manner to Example 1, except that PBR-3 was used in place of PBR-1.

The thus-obtained thermoplastic elastomer composition pellets were injection-molded, and evaluation of the thus-obtained molded product was conducted in accordance with the aforesaid methods. The results are shown in Table 3.

Comparative Example 2

Pellets of a thermoplastic elastomer composition were obtained in a similar manner to Example 1, except that a non-crystalline propylene/butene copolymer (manufactured by Huntsman Polymers Corporation, trade name: REXTAC2780A (melt viscosity at 190° C.: 8000 cps, intrinsic viscosity (η) as measured in decalin at 135° C.: 0.51 dl/g, density: 0.86 g/cm$^3$, melting point: having no peak) was used in place of PBR-1.

The thus-obtained thermoplastic elastomer composition pellets were injection-molded, and evaluation of the thus-obtained molded product was conducted in accordance with the aforesaid methods. The results are shown in Table 3.

Comparative Example 3

Pellets of a thermoplastic elastomer composition were obtained in a similar manner to Example 1, except that 31 parts by weight of PP-1 was used in place of PBR-1.

The thus-obtained thermoplastic elastomer composition pellets were injection-molded, and evaluation of the thus-obtained molded product was conducted in accordance with the aforesaid methods. The results are shown in Table 3.

Example 3

29 parts by weight of polypropylene (MFR (ASTM D 1238, 230° C., 2.16 kg load): 8 g/10 min, melting point (Tm), 140° C.; hereinafter abbreviated as "PP-1") as component (A), 70 parts by weight of an oil-extended ethylene/propylene/5-ethylidene-2-norbornene copolymer rubber (ethylene content: 57 wt %, diene content: 7.3 wt %, Mooney viscosity (ML$_{1+4}$ (125° C.)): 74, oil extension amount: 50 parts by weight of paraffin-based process oil (trade name: PW-380, manufactured by Idemitsu Kosan Co., Ltd.) per 100 parts by weight of the rubber; hereinafter abbreviated as "EPT") as component (C), 1 part by weight of silicone oil (trade name: SH200, manufactured by Dow Corning Toray Co., Ltd.), 2.5 parts by weight of a 40% concentration carbon master batch as a carbon master batch, 0.1 part by weight of a phenol-based antioxidant as an antioxidant (trade name: IRGANOX 1010, manufactured by Ciba-Geigy Japan), 0.5 parts by weight of a diazo weathering stabilizer (trade name: TINUVIN 326, manufactured by Ciba-Geigy Japan) as a weathering stabilizer, 0.40 parts by weight of an organic peroxide (trade name: PERHEXA 25B, manufactured by NOF Corporation) as a crosslinking agent, and 0.11 parts by weight of diethylene glycol dimethacrylate as a crosslinking aid were sufficiently mixed in a Henschel mixer.

Subsequently, the mixture was granulated using an extruder (product number: TEM-50, manufactured by Toshiba Machine Co., Ltd., L/D=40, cylinder temperature: C1-C2=120° C., C3-C4=140° C., C5-C6=180° C., C7-C8=200° C., C9-C12=220° C., dice temperature: 210° C., screw revolutions: 200 rpm, throughput: 40 kg/h) while supplying 10 parts by weight of a paraffin-based process oil (trade name: PW-380, manufactured by Idemitsu Kosan Co., Ltd.) to the cylinder as a softening agent, thereby obtaining pellets of the thermoplastic elastomer composition.

90 parts by weight of the thus-obtained thermoplastic elastomer composition pellets were well mixed with 10 parts by weight of PBR-1 as component (B) in a Henschel mixer, and the mixture was granulated using an extruder (product number: TEM-50, manufactured by Toshiba Machine Co., Ltd., L/D=40, cylinder temperature: C1-C2=120° C., C3-C4=140° C., C5-C6=180° C., C7-C8=200° C., C9-C12=220° C., dice temperature: 210° C., screw revolutions: 200 rpm, throughput: 40 kg/h), thereby obtaining pellets of the thermoplastic elastomer composition.

The thus-obtained thermoplastic elastomer composition pellets were injection-molded, and evaluation of the thus-obtained molded product was conducted in accordance with the aforesaid methods. The results are shown in Table 3.

Example 4

Pellets of a thermoplastic elastomer composition were obtained in a similar manner to Example 3, except that PBR-2 was used in place of PBR-1.

The thus-obtained thermoplastic elastomer composition pellets were injection-molded, and evaluation of the thus-obtained molded product was conducted in accordance with the aforesaid methods. The results are shown in Table 3.

Example 5

Pellets of a thermoplastic elastomer composition were obtained in a similar manner to Example 1, except that 18 parts by weight of polypropylene, 15 parts by weight of PBR-1 and 66 parts by weight of EPT were used.

The thus-obtained thermoplastic elastomer composition pellets were injection-molded, and evaluation of the thus-obtained molded product was conducted in accordance with the aforesaid methods. The results are shown in Table 3.

TABLE 3

| | Remarks | | Example 1 | Example 2 | Comparative Example 1 | Comparative Example 2 | Comparative Example 3 | Example 3 | Example 4 | Example 5 |
|---|---|---|---|---|---|---|---|---|---|---|
| Thermoplastic elastomer composition | Crystalline polyolefin resin | wt parts | 22 | 22 | 22 | 22 | 31 | 26.1 | 26.1 | 18 |
| | PBR-1 | wt parts | 9 | | | | | 10 | | 15 |
| | PBR-2 | wt parts | | 9 | | | | | 10 | |
| | PBR-3 | wt parts | | | 9 | | | | | |
| | Non-crystalline propylene/butane copolymer | wt parts | | | | 9 | | | | |
| | Ethylene/α-olefin/non-conjugated polyene copolymer (extended with 50 parts of oil) | wt parts | 68 | 68 | 68 | 68 | 68 | 63 | 63 | 66 |
| | Silicone oil | wt parts | 1 | 1 | 1 | 1 | 1 | 0.9 | 0.9 | 1 |
| | Softening agent | wt parts | 10 | 10 | 10 | 10 | 10 | 9 | 9 | 10 |
| | Peroxide | wt parts | 0.4 | 0.4 | 0.4 | 0.4 | 0.4 | 0.36 | 0.36 | 0.4 |
| | Diethylene glycol dimethacrylate | wt parts | 0.11 | 0.11 | 0.11 | 0.11 | 0.11 | 0.1 | 0.1 | 0.11 |
| | Carbon M.B. | wt parts | 2.5 | 2.5 | 2.5 | 2.5 | 2.5 | 2.3 | 2.3 | 2.3 |
| Physical properties | MFR | g/10 min | 1.2 | 1.5 | 1.2 | 1 | 1.2 | 6.0 | 6.5 | 4.3 |
| | Hardness | Shore A | 77 | 77 | 80 | 78 | 84 | 85 | 82 | 75 |
| | Tensile strength | MPa | 6.6 | 6.0 | 6.8 | 6 | 6.7 | 7.7 | 7.5 | 6.2 |
| | Elongation | % | 580 | 560 | 600 | 550 | 500 | 600 | 600 | 590 |
| | Compression set | | 45 | 45 | 45 | 48 | 45 | 48 | 48 | 49 |
| Adhesion to heated rubber molded product | Adhesion strength at 23° C. | MPa | 3.4 | 3.2 | 3.0 | 2.9 | 3.2 | 4.4 | 4.1 | 3.3 |
| | Elongation at 23° C. before peeling | % | 200 | 220 | 130 | 140 | 130 | 220 | 190 | 210 |
| Adhesion to thermoplastic elastoner molded product | Adhesion strength at 23° C. | MPa | 3.5 | 3.8 | 3.0 | 2.9 | 3.2 | 3.9 | 3.8 | 3.2 |
| | Elongation at 23° C. before peeling | % | 210 | 250 | 130 | 160 | 130 | 180 | 190 | 190 |

The invention claimed is:

1. A thermoplastic elastomer composition obtained by dynamic crosslinking with an extruder, the thermoplastic elastomer composition comprising:

(A) 10 to 60 parts by weight of a propylene-based polymer;

(B) 1 to 30 parts by weight of a propylene/1-butene random copolymer; and (C) 89 to 10 parts by weight of an ethylene/α-olefin/non-conjugated polyene copolymer composed of ethylene, an α-olefin having 3 to 20 carbon atoms and a non-conjugated polyene, the total of the components (A) (B) and (C) being 100 parts by weight, and the propylene/1-butene random copolymer (B) satisfying the following conditions (1), (2), (3) and (4):

(1) including a propylene-derived unit in an amount of from 60 to 90 mol % and a 1-butene-derived unit in an amount of from 12 to 35 mol %;

(2) having a triad isotacticity as determined from $^{13}$C-NMR spectrum measurement of from 85% to 99%;

(3) having a molecular weight distribution (Mw/Mn) as determined from gel permeation chromatography (GPC) of from 1 to 3; and (4) having an intrinsic viscosity (η) as measured at 135° C. in decalin of from 0.7 to 12 dl/g.

2. The thermoplastic elastomer composition according to claim 1, wherein the propylene/1-butene random copolymer (B) further satisfies the following conditions (5) and (6):

(5) having a melting point (Tm) as measured with a differential scanning calorimeter of from 40 to 120° C.; and (6) satisfying a relationship between the melting point (Tm) and the content of the 1-butene unit M (mol %) of $160 \exp(-0.020M) \geqq Tm \geqq 125 \exp(-0.032M)$.

3. The thermoplastic elastomer composition according to claim 1, further comprising a softening agent in an amount of from 1 to 200 parts by weight with respect to 100 parts by weight of the total of (A), (B) and (C).

4. The thermoplastic elastomer composition according to claim 1, wherein the triad isotacticity as determined from $^{13}$C-NMR spectrum measurement of the propylene/1-butene random copolymer (B) is from 85% to 97.5%.

5. The thermoplastic elastomer composition according to claim 2, wherein the relationship between the melting point Tm and the content of the 1-butene unit M (mol %) of the propylene/1-butene random copolymer (B) is $160 \exp(-0.022M) \geqq Tm \geqq 125 \exp(-0.032M)$.

6. The thermoplastic elastomer composition according to claim 2, wherein the relationship between the melting point Tm and the content of the 1-butene unit M (mol %) of the propylene/1-butene random copolymer (B) is $146 \exp(-0.022M) \geqq Tm \geqq 125 \exp(-0.032M)$.

7. The thermoplastic elastomer composition according to claim 1, wherein the intrinsic viscosity of the propylene/1-butene random copolymer (B) as measured at 135° C. in decalin is from 1.0 to 12 dl/g.

8. The thermoplastic elastomer composition according to claim 1, wherein the propylene/1-butene random copolymer (B) is obtained by copolymerizing propylene and 1-butene in the presence of an olefin polymerization catalyst, the olefin polymerization catalyst comprising a transition metal compound represented by the following formula (1a), an organoaluminum oxy compound (1b) and/or a compound (2b)

that reacts with the transition metal compound (1a) to form an ion pair:

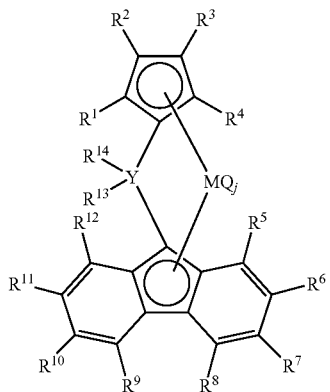

wherein in formula (1a), $R^3$ is a hydrocarbon group or a silicon-containing group; $R^1$, $R^2$ and $R^4$ each independently represent a hydrogen atom, a hydrocarbon group or a silicon-containing group; $R^5$, $R^6$, $R^7$, $R^8$, $R^9$, $R^{10}$, $R^{11}$, $R^{12}$, $R^{13}$ and $R^{14}$ each independently represent a hydrogen atom, a hydrocarbon group or a silicon-containing group, where any adjacent two of $R^5$ to $R^{12}$ may bond to each other to form a ring, and $R^{13}$ and $R^{14}$ may bond to each other to form a ring; M is a transition metal in Group IV; Y is a carbon atom; each Q independently represents a halogen atom, a hydrocarbon group, an anion ligand or a neutral ligand capable of coordination with a lone electron pair; and j is an integer of from 1 to 4.

9. The thermoplastic elastomer composition according to claim 8, wherein the olefin polymerization catalyst further comprises an organoaluminum compound (c).

10. The thermoplastic elastomer composition according to claim 1, which is used for welding to a molded product of vulcanized rubber or to a molded product of thermoplastic elastomer.

11. The thermoplastic elastomer composition according to claim 10, further comprising a blowing agent.

* * * * *